(12) United States Patent
Gerhardinger et al.

(10) Patent No.: US 7,002,115 B2
(45) Date of Patent: Feb. 21, 2006

(54) METHOD FOR PRODUCING ELECTRICALLY CONDUCTIVE HEATED GLASS PANELS

(75) Inventors: Peter F. Gerhardinger, Maumee, OH (US); Randall L. Bauman, Curtice, OH (US); Dillon R. Ashton, Luckey, OH (US)

(73) Assignee: Engineered Glass Products, LLC., Chicago, IL (US)

( * ) Notice: Subject to any disclaimer, the term of this patent is extended or adjusted under 35 U.S.C. 154(b) by 0 days.

(21) Appl. No.: 10/833,572

(22) Filed: Apr. 28, 2004

(65) Prior Publication Data

US 2004/0195233 A1    Oct. 7, 2004

Related U.S. Application Data

(62) Division of application No. 10/256,391, filed on Sep. 27, 2002.

(60) Provisional application No. 60/339,409, filed on Oct. 26, 2001, provisional application No. 60/369,962, filed on Apr. 4, 2002.

(51) Int. Cl.
*H05B 3/16* (2006.01)

(52) U.S. Cl. .................. 219/543; 219/203; 219/451.1; 219/522; 29/611; 438/98

(58) Field of Classification Search ............ 219/75.14, 219/543, 541, 45.1, 203, 451.1, 219, 522; 29/25.42, 611; 438/98, 393
See application file for complete search history.

(56) References Cited

U.S. PATENT DOCUMENTS

| | | | |
|---|---|---|---|
| 2,235,681 A | 3/1941 | Haven et al. | |
| 3,731,354 A | * 5/1973 | Rayburn | ............ 29/25.42 |
| 3,935,422 A | 1/1976 | Barnes et al. | |
| 3,968,342 A | 7/1976 | Inaba | |
| 3,996,398 A | 12/1976 | Manfredi | |
| 4,017,661 A | 4/1977 | Gillery | |
| 4,127,763 A | 11/1978 | Roselli | |
| 4,248,015 A | 2/1981 | Stromquist et al. | |
| 4,260,876 A | 4/1981 | Hochheiser | |
| 4,297,391 A | 10/1981 | Lindmayer | |
| 4,298,789 A | 11/1981 | Eichelberger et al. | |
| 4,331,703 A | 5/1982 | Lindmayer | |
| 4,453,669 A | 6/1984 | Karla et al. | |
| 4,459,470 A | 7/1984 | Shlichta et al. | |
| 4,511,600 A | 4/1985 | Leas | |
| 4,552,611 A | 11/1985 | Dery et al. | |

(Continued)

FOREIGN PATENT DOCUMENTS

WO    WO 01/56334 A1    8/2001

*Primary Examiner*—Robin D. Evans
*Assistant Examiner*—Leonid M. Fastovsky
(74) *Attorney, Agent, or Firm*—Marshall & Melhorn, LLC.

(57) ABSTRACT

An electrically conductive heated glass panel assembly, control system, and method for producing panels are provided to warm objects and to insure unobstructed viewing through glass by removing moisture. An integrated connection circuit interconnects glass sheets, which have a low emissivity conductive coating deposited thereon. The circuit includes copper bus bars that are disposed onto the conductive coating through the use of a circularly rotating or an inline heating head and mask apparatus. A metallic tab, which extends from the glass sheet's peripheral edge, is disposed onto each conductive metal bus bar for external electrical connectivity. Two types of glazing channels are offered to interconnect multiple panels to external circuits and controls. A solid-state controller may be provided to obtain sensor control signals so as to drive a triac circuit that provides current flow through the panel for the desired heating.

15 Claims, 22 Drawing Sheets

U.S. PATENT DOCUMENTS

| | | |
|---|---|---|
| 4,641,013 A | 2/1987 | Dunnigan et al. |
| 4,665,304 A | 5/1987 | Spencer |
| 4,765,928 A | 8/1988 | Thakur |
| 4,808,490 A | 2/1989 | Tsukuda et al. |
| 4,835,071 A * | 5/1989 | Williams et al. ............... 429/11 |
| 4,885,187 A * | 12/1989 | Koenig ........................ 427/58 |
| 5,256,858 A | 10/1993 | Tomb |
| 5,319,301 A | 6/1994 | Callahan et al. |
| 5,406,049 A | 4/1995 | Reiser et al. |
| 5,414,240 A | 5/1995 | Carter et al. |
| 5,543,601 A | 8/1996 | Bartrug et al. |
| 5,577,158 A | 11/1996 | Källgren et al. |
| 5,592,073 A | 1/1997 | Redlich |
| 5,616,263 A | 4/1997 | Hyllberg |
| 5,737,852 A | 4/1998 | Shukla |
| 5,852,284 A | 12/1998 | Teder et al. |
| 5,932,128 A | 8/1999 | Dishop |
| 5,940,579 A | 8/1999 | Källgren et al. |
| 5,965,246 A * | 10/1999 | Guiselin et al. ............ 428/212 |
| 5,990,449 A | 11/1999 | Sugiyama et al. |
| 6,008,473 A | 12/1999 | Gillner et al. |
| 6,031,208 A | 2/2000 | Witt |
| 6,037,572 A * | 3/2000 | Coates et al. ............ 219/451.1 |
| 6,051,820 A | 4/2000 | Poix et al. |
| 6,065,424 A | 5/2000 | Shacham-Diamand et al. |
| 6,072,165 A | 6/2000 | Feldman |
| 6,111,224 A | 8/2000 | Witt |
| 6,144,017 A | 11/2000 | Millett et al. |
| 6,207,522 B1 * | 3/2001 | Hunt et al. ................. 438/393 |
| 6,262,396 B1 | 7/2001 | Witt |
| 6,320,164 B1 | 11/2001 | Millett |
| 6,620,645 B1 * | 9/2003 | Chandra et al. .............. 438/98 |

* cited by examiner

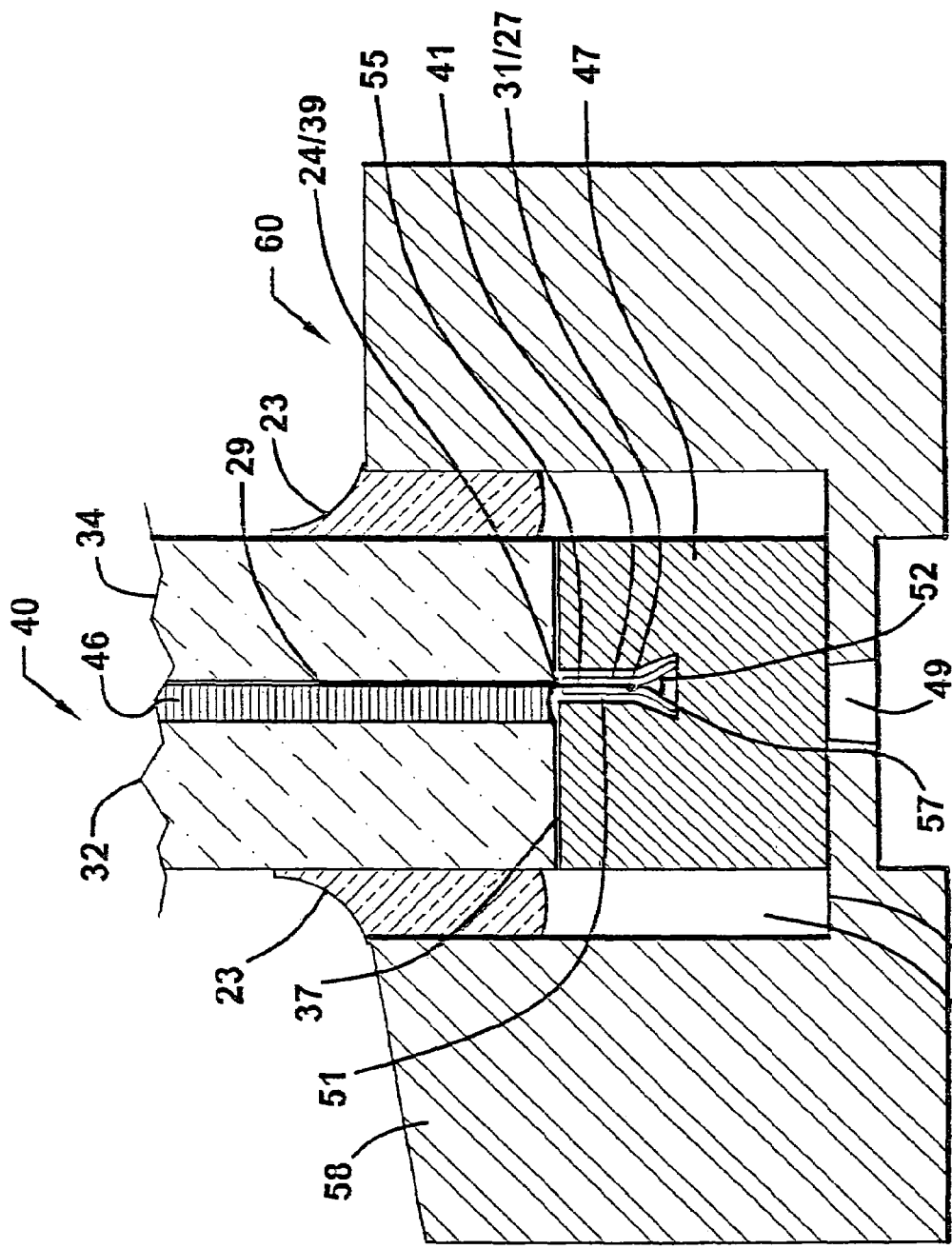

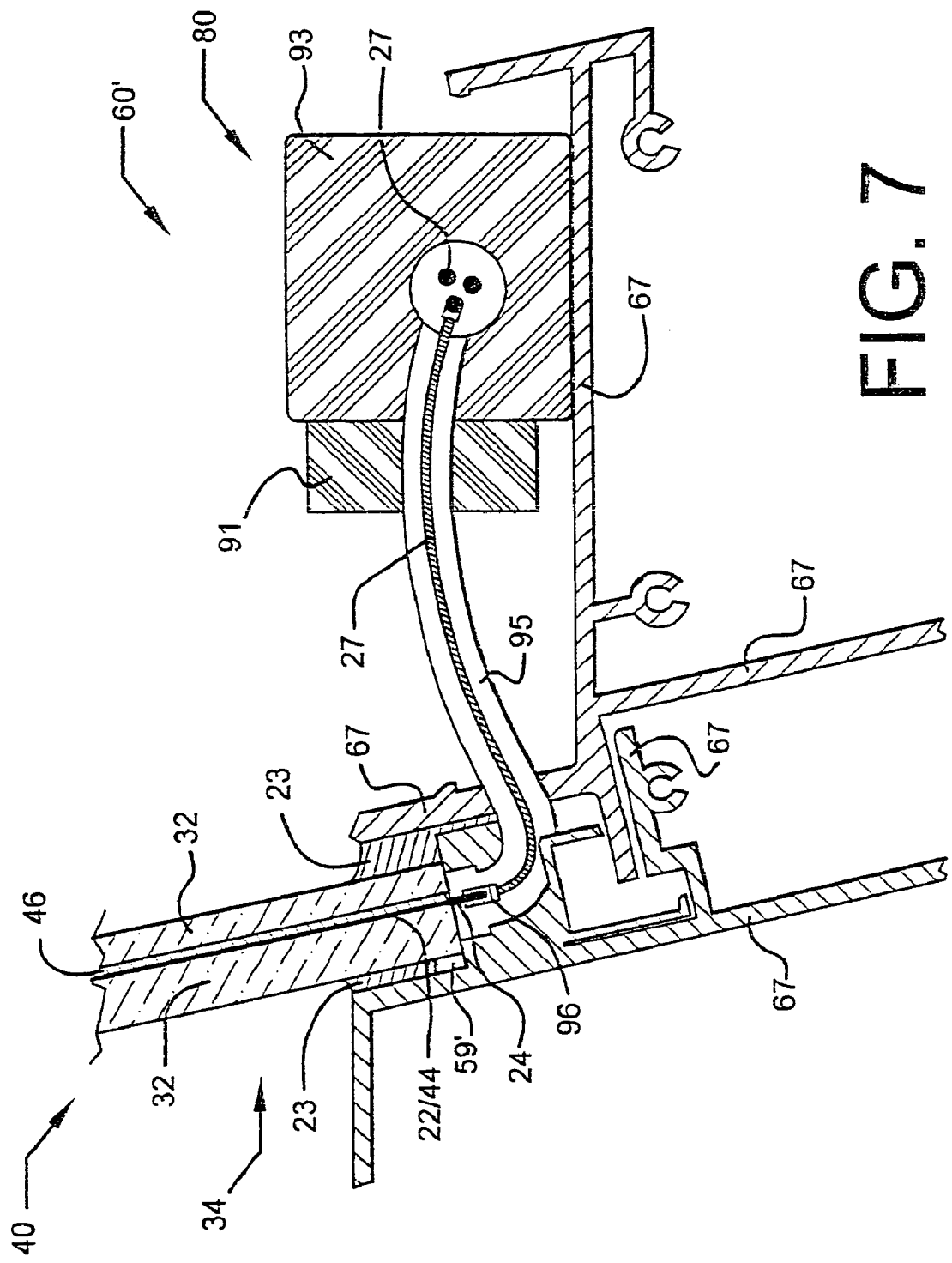

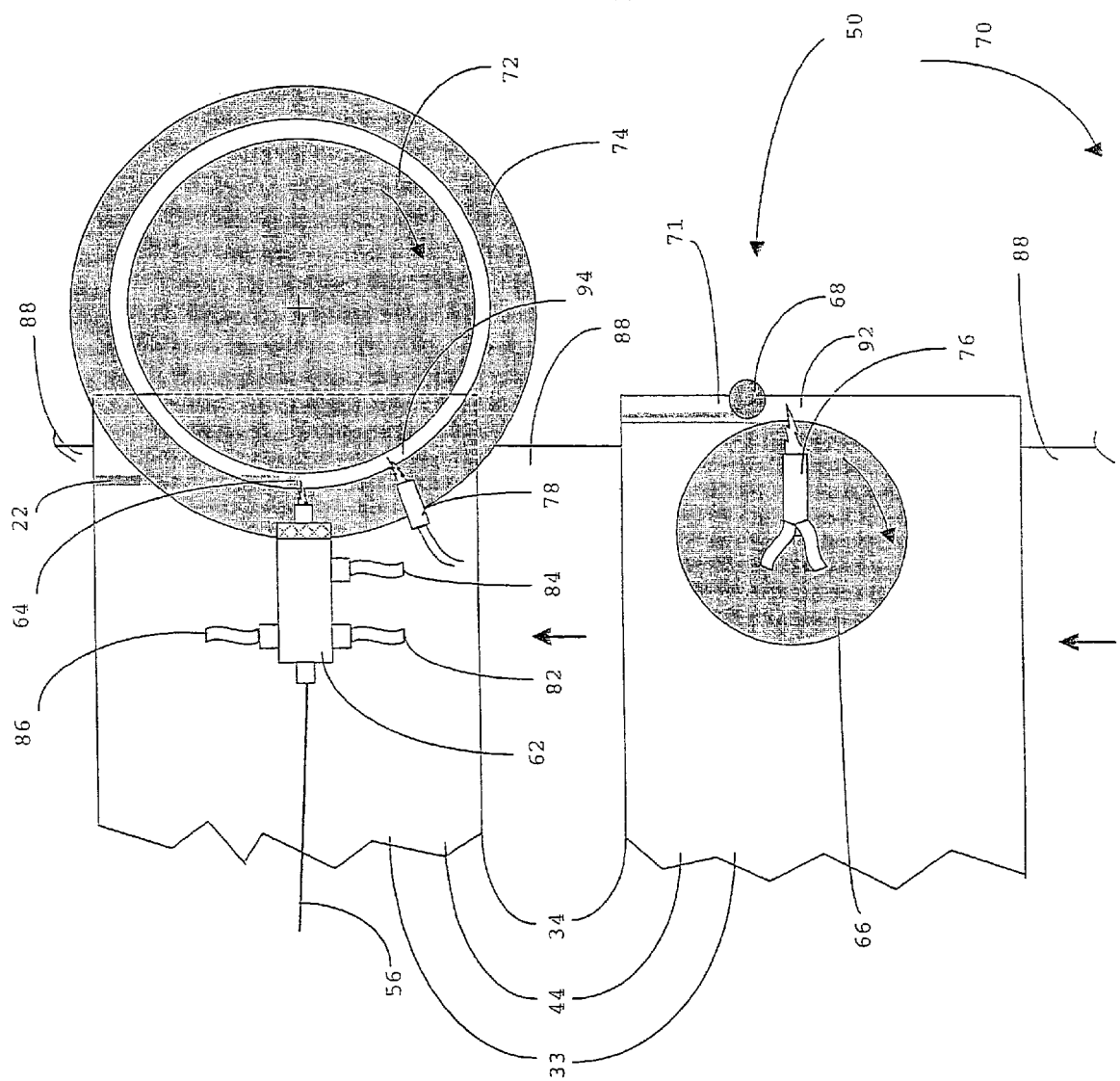

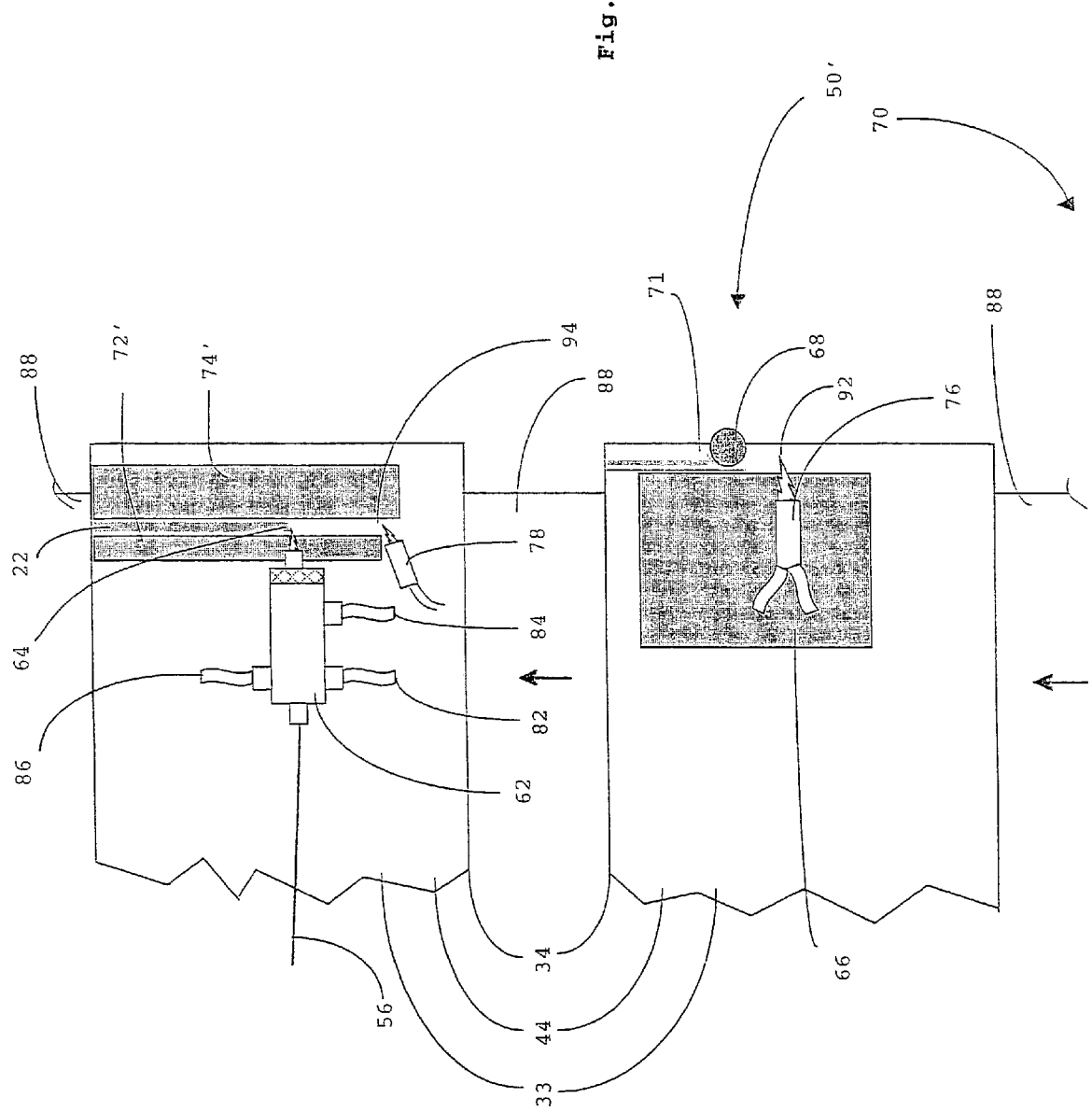

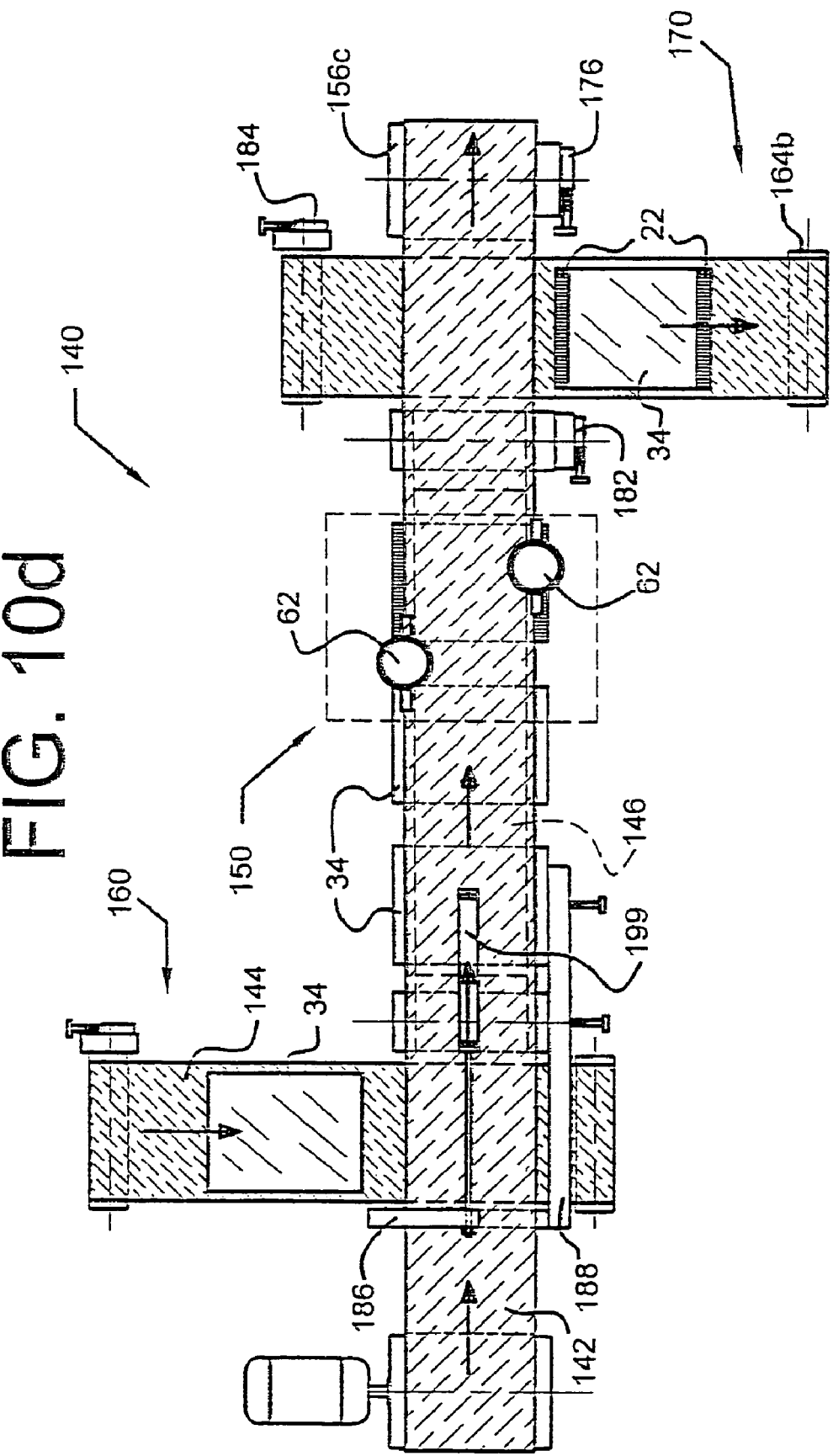

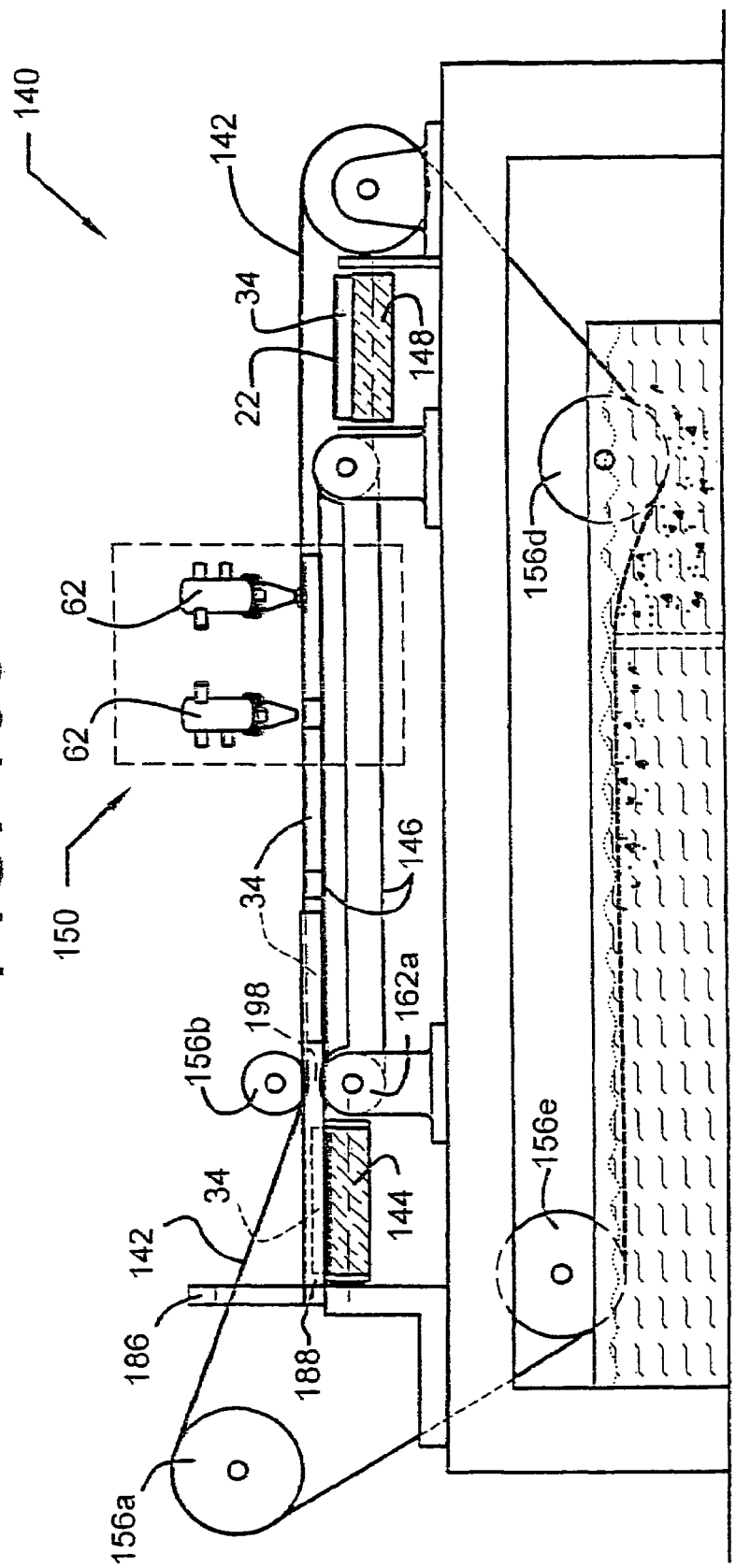

METHOD FOR PRODUCING ELECTRICALLY CONDUCTIVE HEATED GLASS PANELS

This application claims the benefit, under 35 U.S.C. § 119(e), of U.S. Provisional Patent Applications Ser. No. 60/339,409, filed Oct. 26, 2001 under 35 U.S.C. § 111(b), and Ser. No. 60/369,962, filed Apr. 4, 2002 under 35 U.S.C. § 111(b), which applications are incorporated herein in their entirety.

This application is a divisional application of and claims benefit, under 35 U.S.C. § 120, of pending U.S. patent application Ser. No. 10/256,391, filed Sep. 27, 2002, which application is incorporated herein in its entirety.

BACKGROUND OF THE INVENTION

The present invention generally relates to electrically conductive heated glass panel assemblies and control systems, for warming objects and for the removal of moisture on such glass panel assemblies. More particularly, the present invention relates to regulating the flow of current in low emissivity (low E) conductive metal oxide coatings on insulated glass (IG) panels and laminated structures. Most particularly, the present invention deals with the electrical connectivity to insulated glass panels, laminated structures, and combinations thereof.

At the present time, heating, cooking, moisture control, and the electrical control of such processes and activities do not take full advantage of the potential of the use of coated glass. In general, utilizing thin-film coatings to produce heat in a glass panel is an established concept. However, in the past, the film deposition techniques, such as those used in spray coating, were not precise, which resulted in non-uniform coatings and consequently imprecise heating. Recently, the depositing of the coatings has improved, for example, through the use of chemical vapor deposition (CVD), but the electrical control of and connectivity to the coatings has not.

An application of heated glass that has seen these changes over the last thirty years is, for example, the commercial refrigerator and freezer doors in supermarkets, where a tin oxide coating is disposed on one of the interior surfaces of an IG panel and where an electric current is dissipated in the tin oxide to provide heat to raise the glass temperature above the dew point. On such doors, the heat eliminates the formation of condensation, so that employees and customers can view the refrigerator/freezer contents after individuals have opened and closed the doors.

However, non-uniform coatings and traditional electrical control methods result in wasted energy, produce hot and cold spots on the glass, and can result in safety hazards should the glass break and expose the current-carrying film. This approach could benefit from control opportunities that exist using the current state of control technology.

For transportation applications, where heated windows and mirrors provide drivers and occupants of land, air, and water vehicles unimpeded viewing by the removal of condensation, breakage of the electrically heated glass panels can also result in electrical safety problems. Underwriters Laboratories (UL) has expressed interest in improving the breakage of electrically heated glass panels and consequently the exposure of live electrical conductors within the glass.

In convenience stores and delicatessens, sandwiches and other food items are kept warm in glass enclosed food warmers, through the use of base electrical element heaters. The use of glass enclosures does allow the contents to be seen, but the use of only base electrical ribbon element heaters does not allow for radiant heating techniques that would be advantageous for the warming of food items from an area above the food items.

Commercial buildings, sports stadium skyboxes, sloped glazing in atria, canopies, and general fenestration applications, could benefit from the use of electrically heated glass panels, but the underlying reason for the reluctance to adopt these technologies in architectural applications is the lack of an integrated connection circuit and a systems approach to these applications. Expanding the adoption of these technologies, however, is hampered by the complexity of safely, reliably, and cost effectively combining glass and electricity.

There have been many methods advocated to electrically control heated glass panels. Among them are: direct connection to 120V AC power, use of step-down transformers, resistor-capacitor (RC) networks, triacs, and control circuits that directly drive resistive loads. All of these approaches have their benefits and also their disadvantages.

Some of the problems that must be overcome by the electrical controls are: (a) electrical shock potential, (b) circuitry components releasing significant heat to the overall system, (c) overload of the integrated connection circuits that supply the power to the panels, (d) bulkiness of the parts used in the control method, (e) lack of mounting space for the parts, (f) electrical interference generated by the control method, (g) lack of predictability and complexity of the control method, and (h) overall serviceability and costs.

The RC network approach that is taught in U.S. Pat. No. 5,852,284 to Teder et al. uses an RC circuit in series with the conductive coating on the glass to match the power supply with the characteristics of the glass assembly. Typically the value of the capacitor can be chosen for the desired power density via known electrical engineering calculations. In this method, the capacitor functions by changing the phase angle between the voltage and current of the applied AC voltage, hence regulating the power dissipation.

Disadvantages of this method are that capacitors of the required value are: (1) physically large and may be expensive, (2) when a capacitor fails, the full line voltage may be applied across the coated glass, (3) there is no integrated protection using such a method, so over-current protection must be provided, (4) handling many different applications is problematic, such that either a stock of a large number of different values of capacitors would be required or a large number of series-parallel networks must be constructed, which can also complicate the issues of required space and cost, and (5) the varying electrical phase angle may present power quality problems.

The use of triacs has shown promise as a way to vary the current that is applied to electrically coated sheets of glass. Examples of triac use are U.S. Pat. No. 4,260,876 to Hochheiser and U.S. Pat. No. 5,319,301 to Callahan et al. However, this use must overcome the negative effects of the triacs generating high peak currents, high harmonic distortion, and electromagnetic interference (EMI).

The use of electrical control circuits to operate the triacs, which in turn controls the current through the electrically conductive heated glass panel assembly and control systems, has the potential to minimize these negative effects, but to-date it has not been able to accomplish that task. Consequently, the application of triacs has not fully been able to solve the aforementioned problems in the control of electrically conductive heated glass panel assembly systems.

Also, the interconnections between the parts of an electrically conductive heated glass panel assembly and control system have typically been treated as individual parts and not as part of an overall system. In some cases, the bus bars have been screen-printed or fired conductive silver frits. These are difficult and expensive to print and difficult to solder external leads to, where special solder is required.

Further, various metallic tapes, including copper, have been attached to glass using adhesives but these connections exhibit poor adhesion to the glass. Also, rigid electrical terminations at the edge of the glass result from these methods of applying the bus bars, which makes them vulnerable to mechanical flexing, can expose them to condensation, and typically are expensive.

U.S. Pat. No. 2,235,681 to Haven et al., teaches the attaching of metal bus bars to a glass sheet as it applies to structural solder elements but not for electronic control systems.

Producers of crystalline solar cell technology (also referred to herein as photovoltaic technology) have been seeking ways to deposit metal-on-glass. U.S. Pat. No. 6,065,424 to Shacham-Diamand et al., teaches thin metal film coatings sprayed onto glass by the use of an aqueous solution and subsequent annealing of the coatings. In U.S. Pat. No. 4,511,600 to Leas, a conductive metal grid is deposited atop a crystalline solar cell by the use of a mask and orifices (without the use of gas or air pressure to impart dispersion or velocity to the metal particles). The '600 patent also advocates the use of a powdered metal that is heated to a molten temperature in a refractory crucible.

In U.S. Pat. No. 4,331,703 to Lindmayer, a conductive metal is flame sprayed onto a silicon solar cell. In U.S. Pat. No. 4,297,391, also to Lindmayer, particles of a material are formed at a temperature in excess of the alloying temperature of the material and the silicon, and then the two are sprayed onto the surface of the glass at a distance, which causes the material and the silicon to firmly adhere to the surface. The '391 patent also teaches the use of a mask.

Currently, the control of electricity to electrically conductive glass panels centers primarily on control of the heating elements and not on monitoring system parts or the entire heating system for safety, power matching, or the like. For wiring installation purposes of the glass panels, it is common for holes to be drilled in the glass panels at the time of manufacturing and in the framework at the time of installation as well as for termination of wiring that is done in the field.

When the assembly of the electrical panels is completed, some of the controls, wiring, and associated parts are visible to users of these panel systems. Since power supply matching for each application is statically performed, the changing of system variables after manufacturing is, at best, cumbersome, while monitoring of system operating conditions is nearly nonexistent.

Termination of system wiring to existing facility electrical services, as well as on-site glazing operations, is not done with a total systems approach in mind. Thus those skilled in the art continued to seek a solution to the problem of how to provide a better electrically conductive heated glass panel assembly and control system, and a method for producing the panels.

SUMMARY OF THE INVENTION

The present invention relates to depositing conductive metal on sheets of dielectric substrate materials, for example, bus bars on a surface of glass or on an electrically conductive coating that is disposed on a major surface of a glass sheet, the bus bars being deposited by way of a heating head and mask apparatus. In conjunction, the present invention relates to depositing and electrically contacting metallic tabs, which extend from the peripheral edge of the glass sheet to the metal bus bars, to the bus bars thus allowing robust external electrical connection to the electrically conductive coatings.

The glass sheet, so constructed, could be assembled with at least a second glass sheet and a polymeric interlayer therebetween to form a laminated panel. In addition, the glass sheet could be assembled with at least a second glass sheet and a T-shaped spacer-seal, an E-shaped spacer-seal, or the like disposed around a periphery therebetween to form an insulated glass panel.

Heated glass panels, as so described, may be mechanically and electrically interconnected to form a heated glass panel assembly and control system that would further comprise at least one condition-sensing means capable of generating a condition signal, a current-switch, and a solid-state controller capable of reading the condition signal for controlling the current-switch. As a result, the current-switch would control electrical current in the heated glass panel, thus controlling the desired heating of the heated glass panel.

The present invention employs methods of depositing a conductive metal bus bar on an electrically conductive coating that is disposed on dielectric substrate material, for example, a glass sheet, the methods of depositing comprising: 1) if edge deletion is required, precisely thermally shocking or edge masking and heating a first area of the coating with a coating heater, forming a residue of the coating in the first area, removing the residue from the first area with a coating remover, and then regardless of whether edge deletion is required, 2) masking a second area of the coating with an inner mask and an outer mask, where the second area is defined therebetween or by masking a central area of the substrate sheet thus defining the second area as opposing edges, 3) heating the second area with a reducing flame, 4) feeding a conductive metal into a metal feeding and heating device, so as to melt the metal, and propelling particles of the molten metal onto the second area.

Further objects and advantages of the present invention will be apparent from the following description and appended claims, reference being made to the accompanying drawings forming a part of a specification, wherein like reference characters designate corresponding parts of several views.

BRIEF DESCRIPTION OF THE DRAWINGS

FIG. 3 is a cross sectional view of an installation of an electrically conductive heated glass panel and a base setting block, within a first glazing channel in accordance with the present invention;

FIG. 4b is a cross sectional view of an electrically conductive heated glass panel and a base setting block in a fully clasped connection position in accordance with FIG. 4a;

FIG. 4c is a perspective view of an electrically conductive heated glass panel and a connection clip in a fully clasped connection position in accordance with FIG. 4a;

FIG. 7 is a cross sectional view of an installation of an electrically conductive heated glass panel within a second glazing channel in accordance with the present invention;

FIG. 10a is a diagramatic view of a circularly rotating heating head and mask apparatus in accordance with the present invention;

FIG. 10b is a diagramatic view of an inline heating head and mask apparatus in accordance with the present invention;

FIG. 10d is a top plan view of the belt based inline heating head and mask apparatus of FIG. 10c;

FIG. 10e is a side plan view of the belt based inline heating head and mask apparatus of FIG. 10c;

DETAILED DESCRIPTION OF THE PREFERRED EMBODIMENT

Figure 1A:
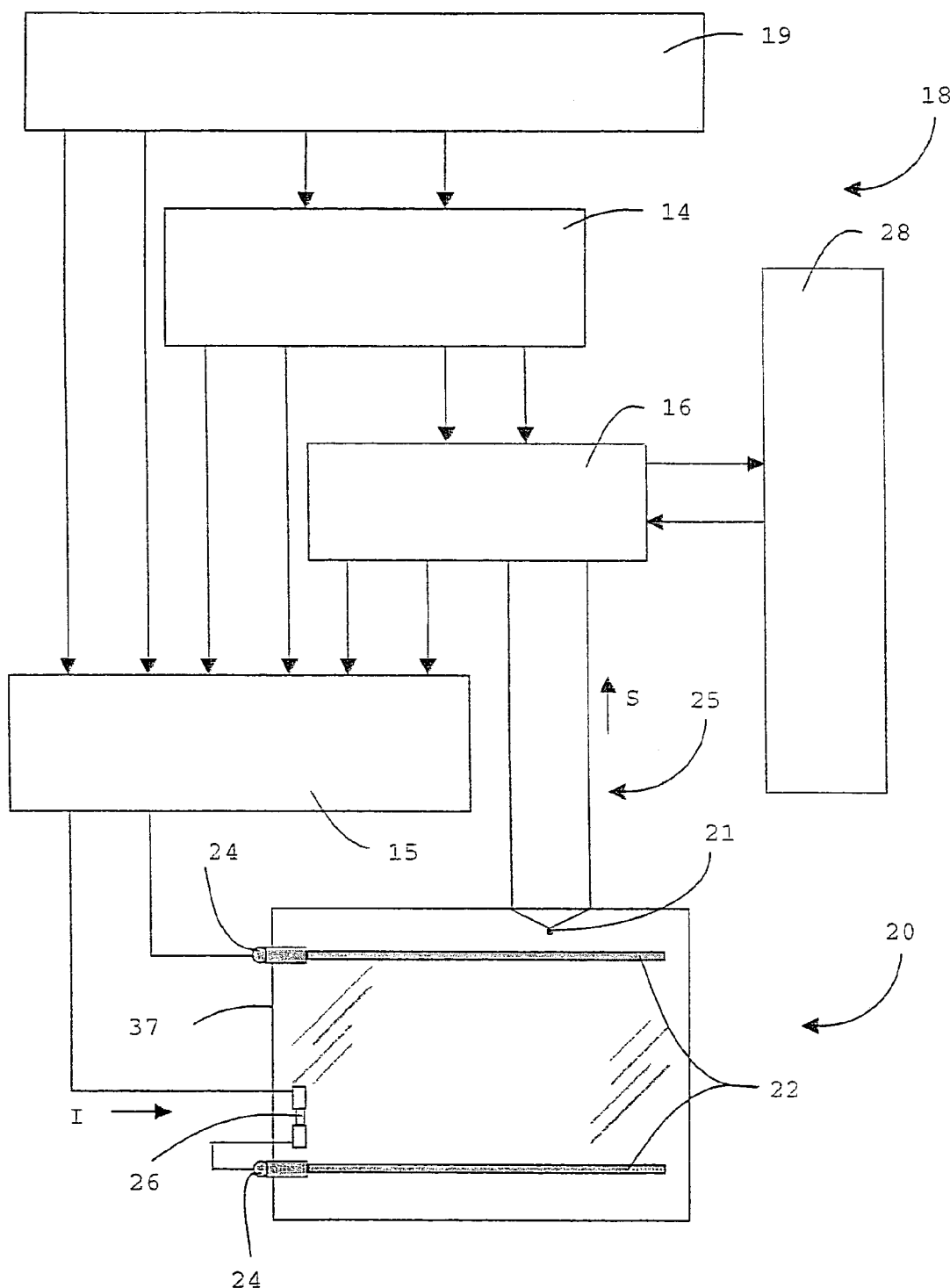
FIG. 1a is a schematic of an overview of an integrated connection circuit in accordance with the present invention.

The present invention employs an integrated connection circuit 18, as shown in FIG. 1a, where electrical current (I) passes through a coating that is disposed on a sheet of a dielectric material, for example, an electrically conductive heated glass panel 20, to generate heat that can be used for warming, cooking, moisture control, and the like. The panel 20 may be realized within the present invention as a laminated panel 40, an insulated glass panel 30, or a combination thereof. The present invention has been found to apply to sheets that are dielectric substrate materials other than glass, for example, ceramic and glass-ceramic materials.

In order to control the electrical current (I) flowing through the electrically conductive heated glass panel 20, a solid-state controller 16, for example, a programmable application-specific integrated circuit. (ASIC) chip, would monitor inputs like a signal (S) from a condition-sensing means, for example, a condition sensor 21. Examples of conditions that could be sensed by the condition sensor 21 include, but are not limited to, temperature, moisture, voltage, and current. Also, the signal (S) may be obtained from voltages taken across the bus bars 22. If those voltage signals (S) are taken rapidly by way of the controller 16 the voltages can be converted into an indication of the temperature of the panel 20.

Another way the present invention may obtain a signal (S) is through the placement of a thermostatic switch (not shown) on a major surface 33 of the panel 20, wherein if the temperature of the surface 33 reaches a first setpoint, the thermostatic switch is electrically conductive and if the surface temperature reaches a second setpoint the thermostatic switch is electrically nonconductive.

Figure 2:
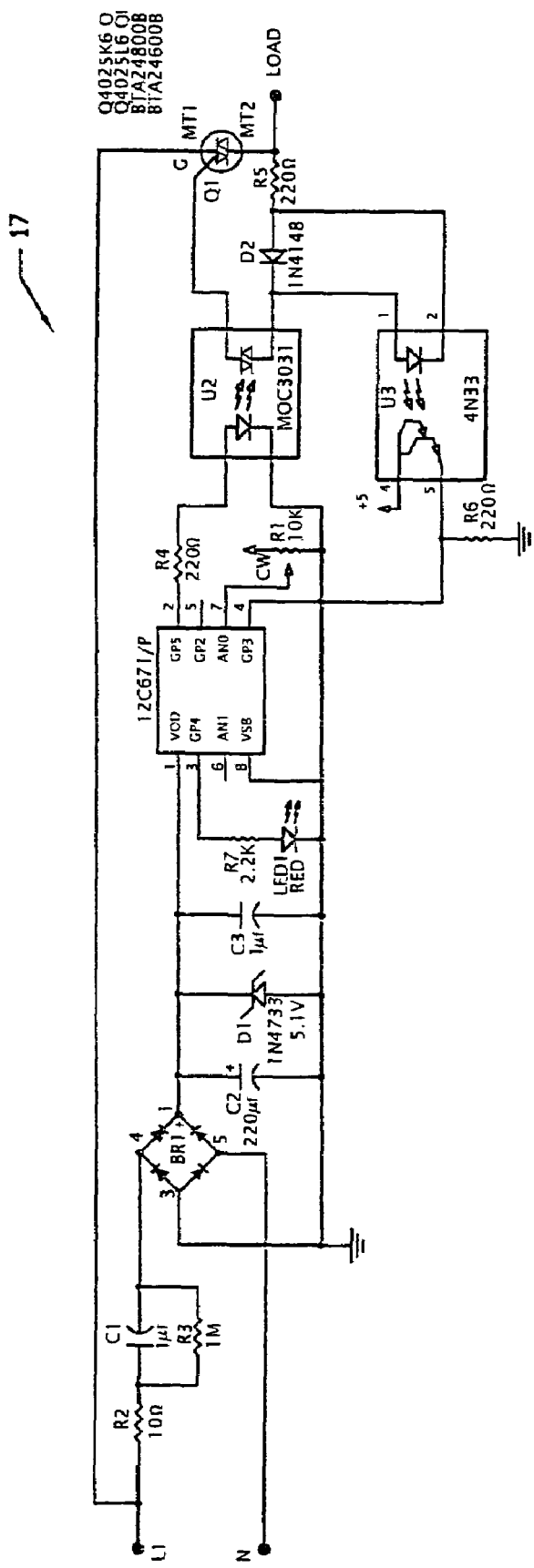
FIG. 2 is a schematic of a current-switch circuit that employs triacs in accordance with the present invention.

Upon receiving the signal (S), the solid-state controller 16 might respond to the signal (S) by commanding various operations, like controlling a current-switch circuit 15, for example, a triac circuit 17 shown in FIG. 2, to be operated in a zero-axis crossing manner.

Consequently, the solid-state controller 16 would precisely control heating of the electrically conductive heated glass panel 20.

By operating the triac circuit 17 in the zero-axis crossing manner, problems such as harmonic distortion and electromagnetic interference (EMI) are overcome. Use of the zero-axis crossing manner also minimizes capacitive coupling and leakage current problems associated with using dielectric material with electrical currents (I).

In the present invention, the current-switch circuit 15, under control of the solid-state controller 16, would provide optical isolation (as shown in FIG. 2 by components U2 and U3) in the current-switch output control lines. In turn, this minimizes electrical interference to control circuit 25, the electrically conductive heated glass panel 20, and external sensors and controls 28.

In addition, the solid-state controller 16 allows the present invention to usefully integrate disparate parts of the electrically conductive heated glass panel 20 in a more comprehensive manner than RC networks and other control methods can provide. This allows the solid-state controller 16 to more effectively control appliances, for example, a heating element, vehicles, or building functions by way of the external sensors and controls 28, while employing wired or wireless devices. System variables are easily changed by a use of the solid-state controller 16.

Further, the solid-state controller 16 would provide impedance matching for the current-switch circuit 15, which would result in more complete system safety by monitoring voltage and current levels that are too high and too low. This would protect users and system components, for example, by shutting down associated equipment. Other forms of electrically conductive heated glass panel controls may not be able to provide this capability.

Additionally, regarding glass breakage safety, the solid-state controller 16 is capable of monitoring the current (I) passing threw the coating 44 on the panel 40. If the current (I) were to cease in the coating 44 then the panel 40 may have broken. Also a strip switch 26 may be applied that would be sealed within the laminated glass panel 40, as further illustrated in FIG. 9. If the uncoated glass sheet 32 were to break then the current (I) through the strip switch 26 would cease, wherein the solid-state controller 16 would sense a change in the current (I), would cut off power to the damaged laminated glass panel 40, and would signal users of the integrated control circuit 18 of such an event, so as to keep the users from being exposed to an electrical shock and physical cuts due to broken glass.

By operating the current-switch circuit 15 in the zero-axis crossing manner, the solid-state controller 16 does not require controlling capacitors. This reduces cost, weight, and number of system components, which consequently reduces the necessary space to mount them. In addition, the solid-state controller 16 provides electrical isolation for system components that other control circuits cannot provide and the solid-state controller 16 provides power source conditioning, which better manages electrical component requirements.

As a result, maintenance replacement inventories are simplified, field adjusting of system devices and set points are reduced, as well as associated costs. Since the solid-state controller 16 can read internal and external system signals (S), precision control of glass temperatures can be provided, system performance can be monitored, and early warning of system problems can be detected that other electrically conductive heated glass panel control-methods cannot achieve.

Figure 1B:
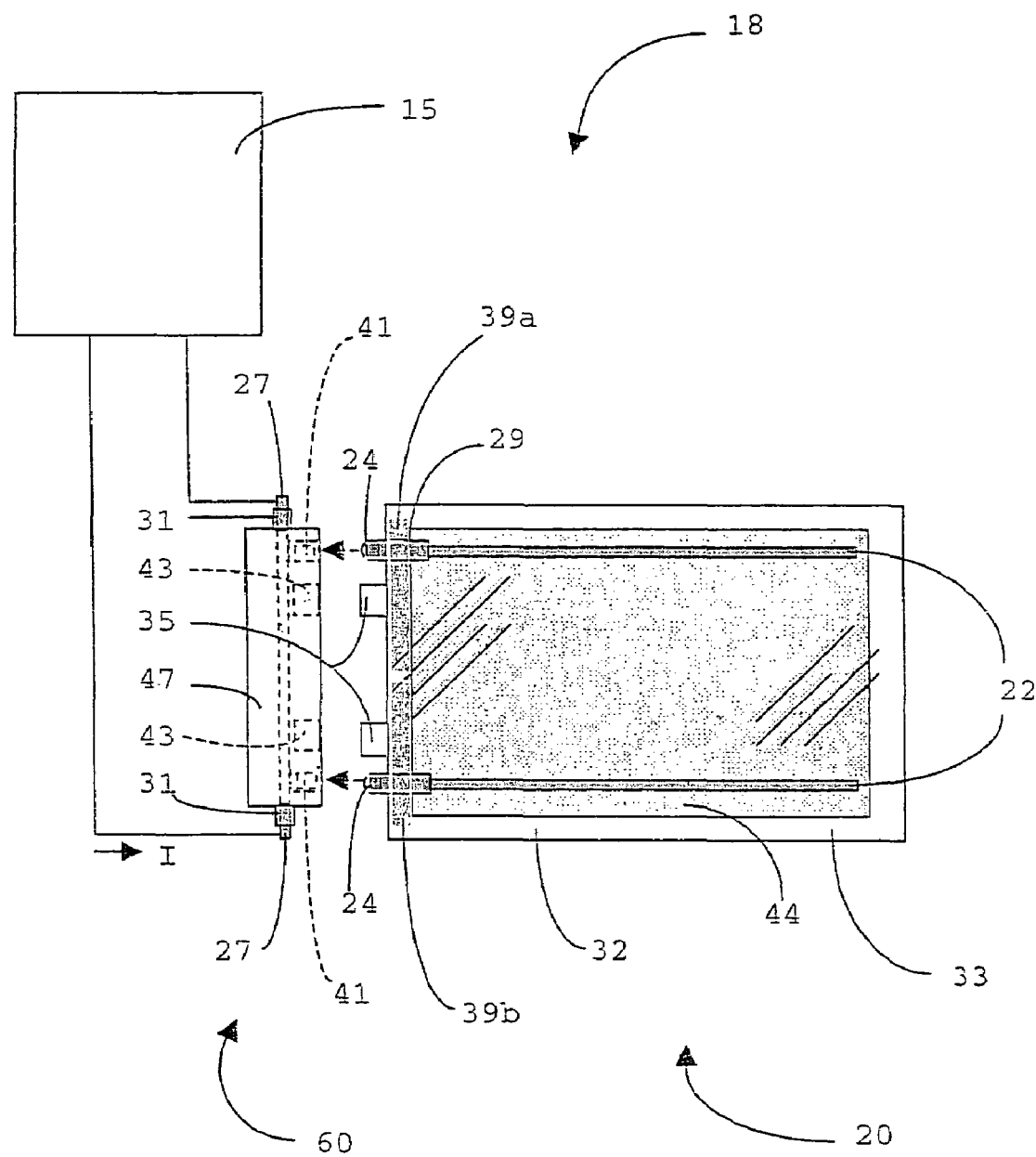
FIG. 1b is a schematic of an interconnection of an electrically conductive heated glass panel and a first glazing channel in accordance with the present invention.

To interconnect the electrically conductive heated glass panel 20 to the current-switch circuit 15 and to interconnect a plurality of electrically conductive heated glass panels 20, a first glazing channel 60 may be employed, as shown in FIG. 1*b*. Panel setting blocks 35, that are disposed on the electrically conductive heated glass panels 20, mate with base setting indentations 43 to provide mechanical mounting for the electrically conductive heated glass panels 20.

Further, portions of metal foil 39*a*, 39*b* are disposed within the electrically conductive heated glass panels 20, from a glass panel peripheral edge 37, up to a sight line 29, and onto metallic tabs 24. The metallic tabs 24 and foil 39 electrically connect to the first glazing channel 60 by being clasped by connection clips 41, which electrically connect to channel conductors 27. Insulating sleeves 31 and the channel conductors 27, provide means to allow the electrically conductive heated glass panels 20 to be connected to additional electrically conductive heated glass panels 20. Note that the use of metal foil 39 as described here may be applied to other glazing channels.

Consequently, the current-switch circuit 15 that controls the electrical current (I) may allow the electrical current (I) to be conducted through the glazing channel 60, by way of the channel conductors 27 and the connection clips 41. Since the connection clips 41 clasp the metallic tabs 24, the electrical current (I) enters the electrically conductive heated glass panels 20 and passes through bus bars 22 and coating 44, which is disposed on a coated glass sheet 34. As a result, heat is generated within the electrically conductive heated glass panels 20 for heating objects and removing moisture.

Figure 1C:
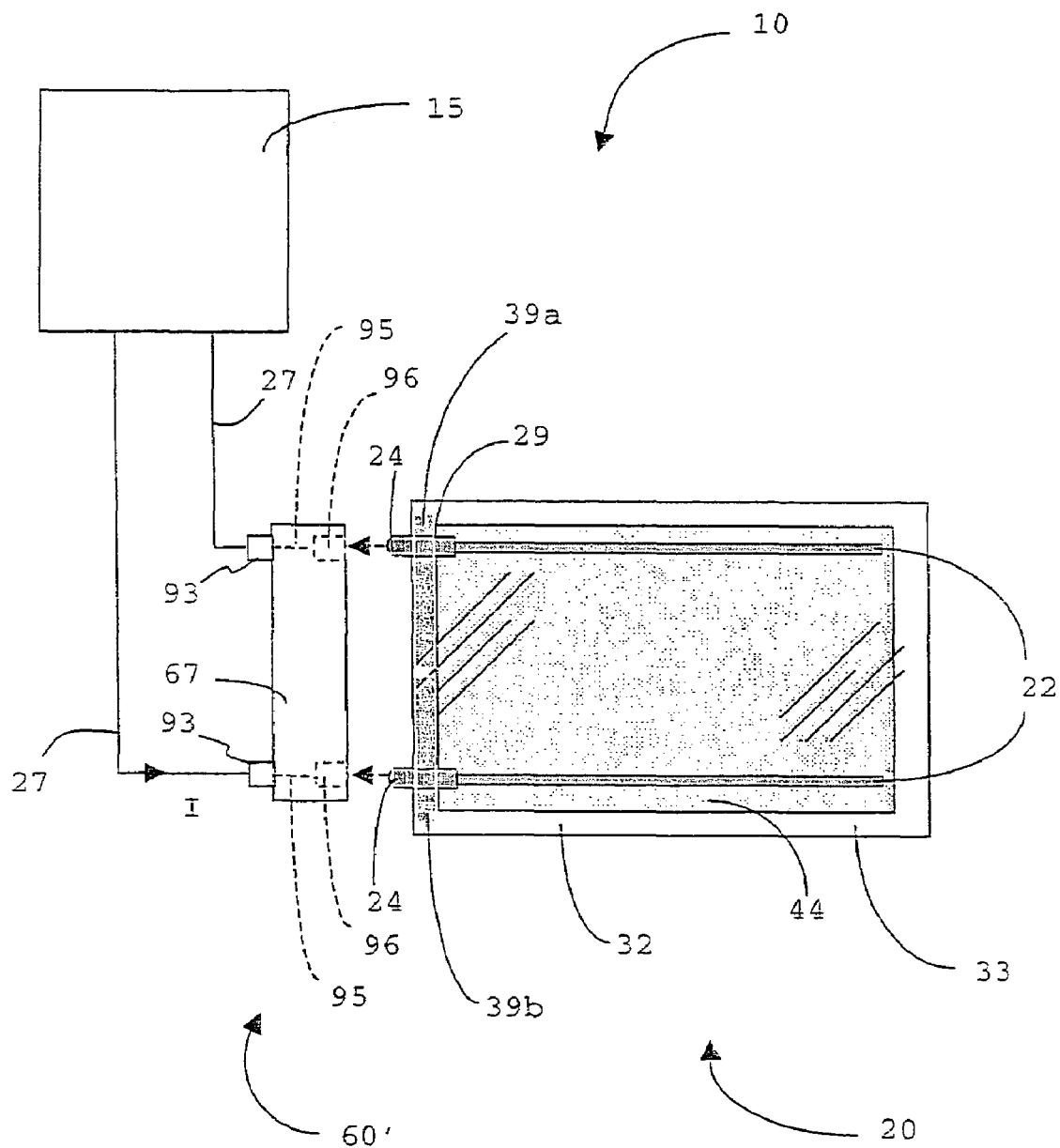
FIG. 1c is a schematic of an interconnection of an electrically conductive heated glass panel and a second glazing channel in accordance with the present invention.

An alternative to the first glazing channel 60 of FIG. 1*b* is a second glazing channel 60', illustrated in FIG. 1*c* and with more detail in FIG. 7. The electrically conductive heated glass panel 20 is mechanically mounted to a channel frame 67 and electrically connected to the metallic tabs 24 by way of spade connection 96 that is attached to an end of the channel conductor 27. The channel conductor 27 is in turn routed through the channel frame 67 by way of a channel conduit 95 and conductor block 93 and then electrically and mechanically connected to the interconnecting channel conductor 27 by conventional means. Glazing seal 23 is disposed in a second glazing channel cavity 59' and in voids throughout the channel frame 67 to seal out moisture and dirt, and to protect the parts of the second glazing channel 60' from damage.

Consequently, the current-switch circuit 15 that controls the electrical current (I) may allow the electrical current (I) to be conducted through the second glazing channel 60'. As a result, heat is generated within the electrically conductive heated glass panels 20 for heating objects and removing moisture. Both glazing channels 60, 60' would be applicable for photovoltaic applications.

It may be noted that conventional type K thermocouples or possibly a thin film thermocouple like that disclosed in U.S. Pat. No. 6,072,165 to Feldman (which is incorporated herein in its entirety) may be used for temperature determination. An advantage of the present invention is that programming the solid-state controller 16 with the coefficient of resistance of the electrically conductive heated glass panel 20 and momentarily sampling voltages across sets of bus bars 22, the solid-state controller 16 could compare those voltages to predetermined thresholds (a.k.a., setpoints) so as to determine the temperature of the panel 20. Thus the temperature of the panel 20 may be controlled without the use of any thermocouple.

By using the controller 16 along with the type K thermocouple, the film thermocouple, or the voltage reading method temperature sensing, a panel, for example, one installed in a sport stadium box, would not overheat, break, or cause damage, as other glass assemblies would.

The solid-state controller 16, the condition sensors 21, the current-switch circuit 15, the metallic tabs 24, direct current power supplies 14 that are illustrated in FIG. 1*a*, along with conventional wiring, insulating boots, terminal strips, direct current to alternating current inverter circuits, ground fault circuit interrupter (GFCI) circuit breakers, on-off alternating power source controls, connections to external sensors and controls 28, NEC electrical wiring termination boxes and connecting wiring, the channel conduit 95, the conductor blocks 93, may all be placed in one or more of the panel frames 48, panel setting blocks 47, channel frames 67, or in conventional NEC control panels. This will result in advantageously placing the parts out of sight, while conserving space.

Referring to FIG. 3, there is shown a first glazing channel 60, which is an assembly of three subassemblies in accordance with an aspect of the present invention: (1) the laminated glass panel 40 (the insulated glass panel 30 or combination laminated and/or IG panel may be employed as well), (2) a base setting block 47, and (3) a glazing channel base 58. In FIG. 3, the laminated glass panel 40 is shown having the metallic tab 24 and the metal foil 39 disposed within the interlayer 46, where the metal foil 39 is disposed from the sight line 29 to the glass panel peripheral edge 37 and onto the exterior portions of the metallic tabs 24, so as to keep the metal foil 39 out of the sight of users.

As shown in FIG. 1*b*, a portion of the metal foil 39*a* that is disposed on a particular metallic tab 24 may not be in direct electrical contact with another portion of metal foil 39*b*, within the same laminated glass panel 40. This separation of the portions of the metal foil 39*a*, 39*b* may be required in order to allow the electrical current (I) to be conducted through one metallic tab 24 and its corresponding bus bar 22, the conductive coating 44, another bus bar 22 and its corresponding metallic tab 24.

External to the laminated glass panel 40, both the metallic tab 24 and the metal foil 39 are shown extending from the glass panel peripheral edge 37. The deposition of the metal foil 39 and the metallic tab 24, as described, causes the two to be in electrical contact with each other, thus providing a measure of redundancy. In addition, FIG. 3 shows the metal foil 39 and the metallic tab 24 being mechanically clasped by opposing inside clasping surfaces 55 of a connection clip 41, the clasping by the clasping surfaces 55 being a result of a spring 52 urging the connection clip 41 about a pivot 57.

The extension of the spring 52 is a result of a movement of the connection clip 41 within the base setting block 47, wherein the base setting block 47 is formed so as to define at least a widened portion of a block cavity 51. As a result of the aforementioned movement, the laminated glass panel assembly 40 and the base setting block 47 abut to form an assembly. Subsequently, the abutment of the laminated glass panel 40 and the base setting block 47 are further abutted to a glazing channel surface 53 that is positioned to define at least a portion of a first glazing channel cavity 59 within a glazing channel base 58.

To further assure that the wiring of the laminated glass panels 40 is hidden from the view of the user and to allow moisture to drain out and away from the laminated glass panels 40, wiring/drain holes 49 may be provided in the glazing channel base 58, preferably at the time of manufacturing, so as to minimize the need to drill holes in the laminated glass panels 40 during installation in a structure or the like.

Unbonded areas (UBAs) may form on the aforementioned assembly, which can result in: (a) moisture entering, (b) glass chipping, (c) glass swelling, and (d) electrical connections being adversely affected. In the present invention, a glazing seal 23 is preferably disposed in assembly voids to minimize the negative effects of UBA.

Figure 4A:
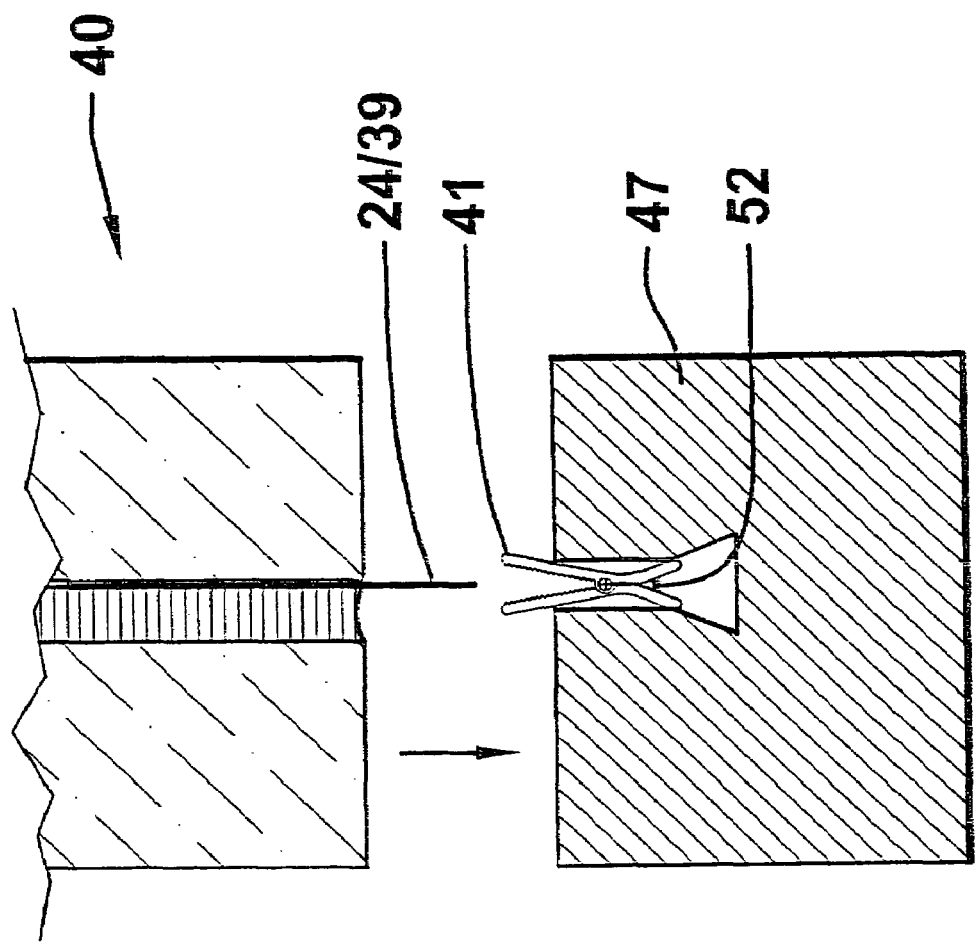
FIG. 4a is a cross sectional view of an electrically conductive heated glass panel and a base setting block in a partially closed connection position in accordance with FIG. 3.
Figure 4B:
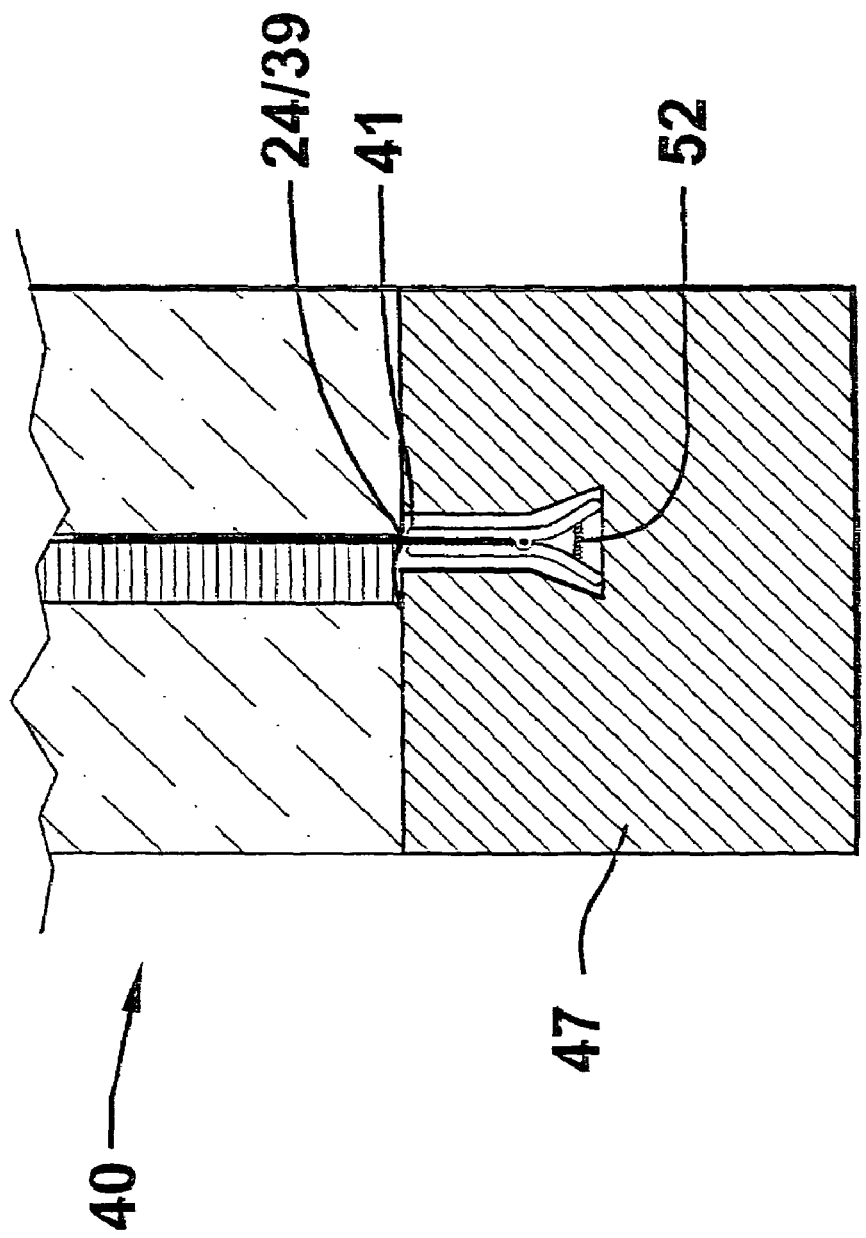
Figure 4C:
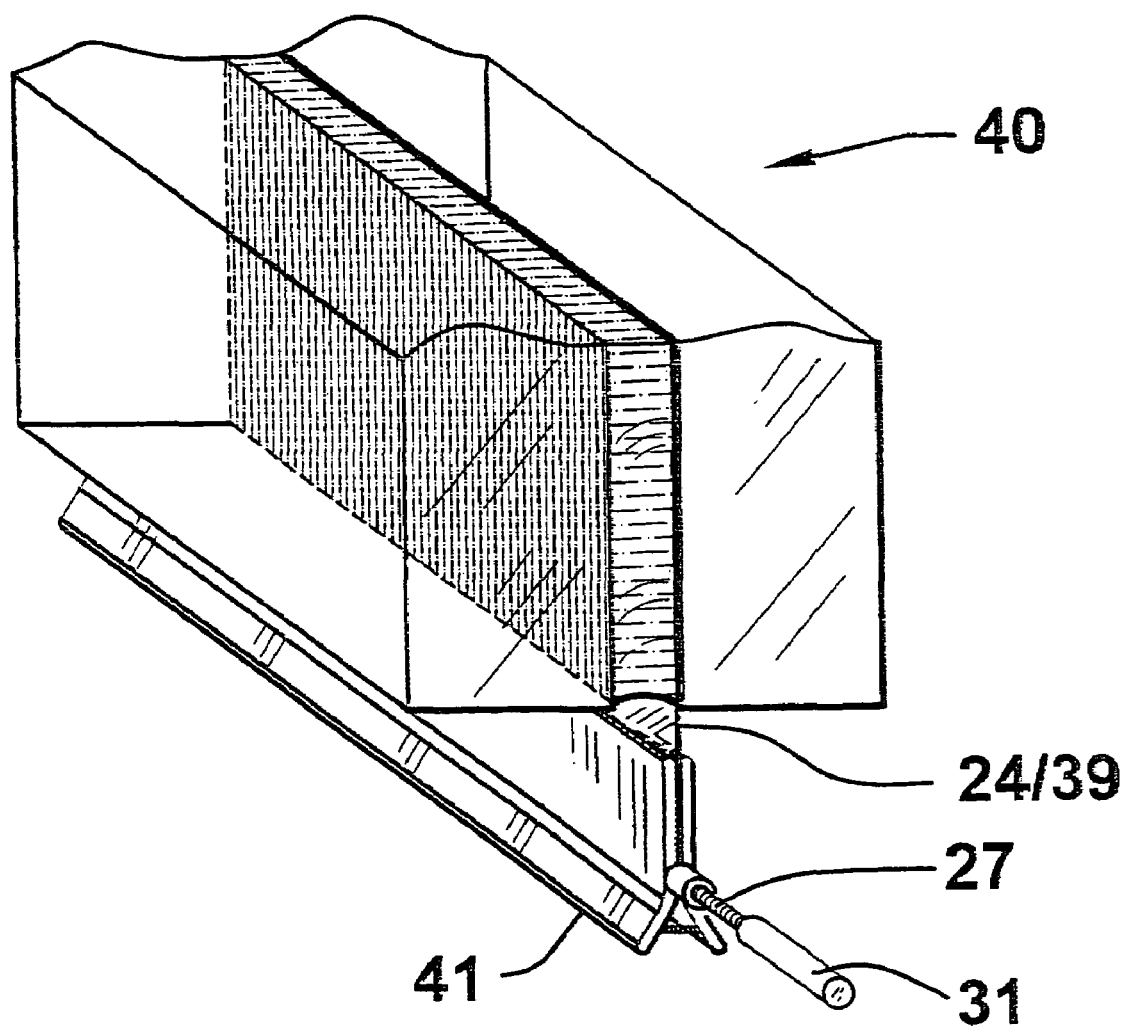

As illustrated in FIGS. 4a–4c, there is shown the laminated glass panel 40 (the insulated glass panel 30 or combination laminated and/or IG panel may be employed as well) being brought into abutment and electrical connection with the base setting block 47 and the connection clip 41 in accordance with FIG. 3. FIG. 4a shows a cross sectional view of a partially closed connection clip 41 where the spring 52 is only partially extended. Also shown is the laminated glass panel 40 approaching the base setting block 47, wherein the attached metal foil 39 and metallic tabs 24 are about to be clasped by the partially open connection clip 41 and its partially extended spring 52.

As the laminated glass panel 40 and the connection clip 41 move into full attachment, the cross sectional view of FIG. 4b shows the complete clasping of the metal foil 39 and the metallic tabs 24 by the connection clip 41 along with the full extension of the spring 52. Also shown in this view are the laminated glass panel 40 and the base setting block 47 in full abutment.

FIG. 4c is a perspective view in accordance with FIG. 4a showing further details of the laminated glass panel 40 having the metal foil 39 and metallic tab 24 fully clasped by the connection clip 41 while showing an extension of the channel connector 27 with insulating sleeve 31 attached to the connection clip 41 at the pivot 57 of the connecting clip 41. The channel connector 27 along with the insulating sleeve 31, may act to interconnect a plurality of base setting blocks 47. Consequently, a plurality of laminated glass panels 40 would be interconnected within the integrated connection circuit 18.

The above discussion on the interconnection of the laminated glass panel 40, by way of the metal foil 39, the metallic tabs 24, the connection clips 41, and the springs 52, in conjunction with the base setting block 47, applies to glass solar panels as well.

Figure 5:
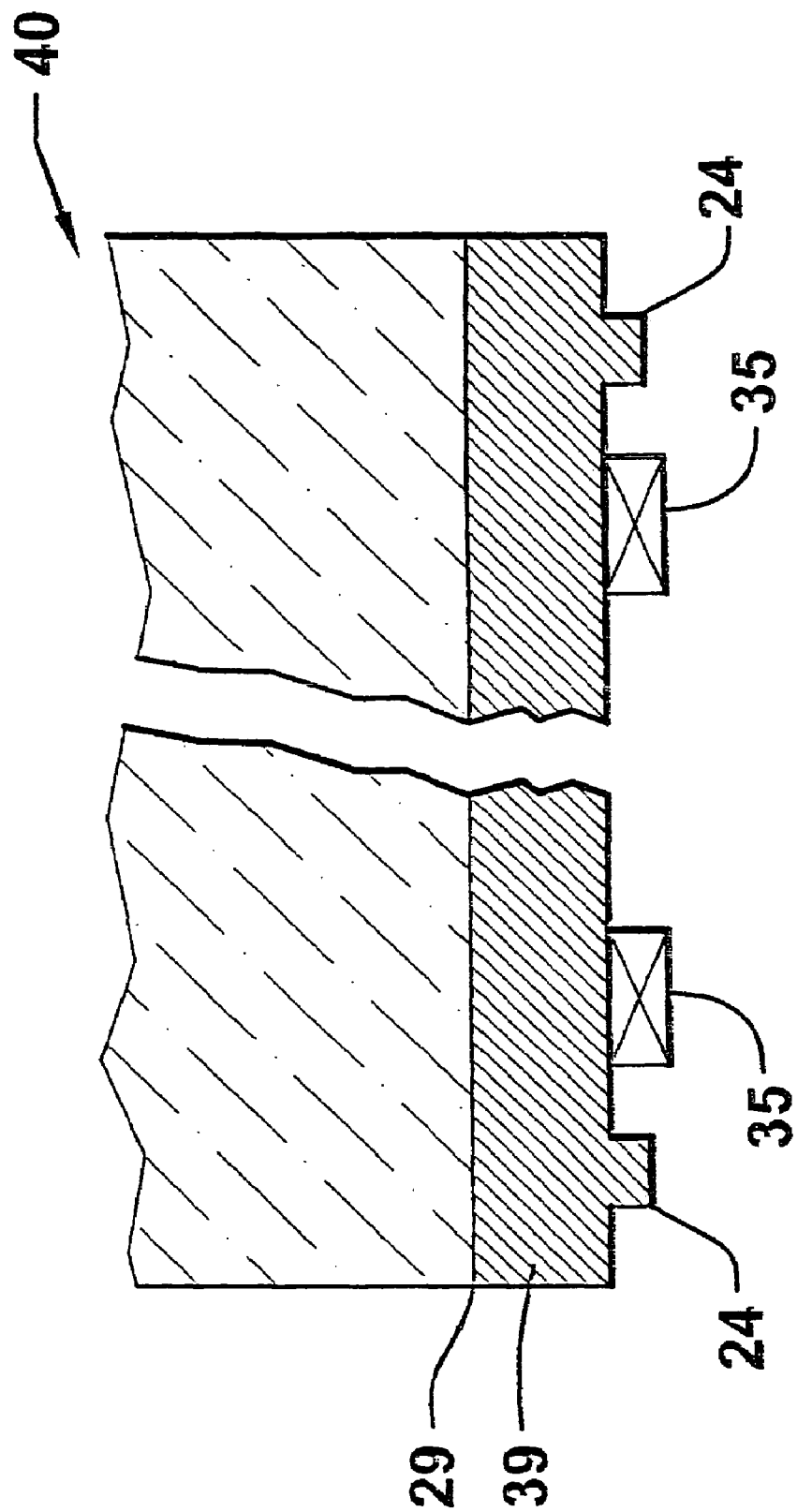
FIG. 5 is a side view of electrical and mechanical connections of an electrically conductive heated glass panel in accordance with the present invention.

Further, FIG. 5, in accordance with the present invention, shows a side view of the electrical and mechanical connection of the laminated glass panel 40 (the insulated glass panel 30 or a combination laminated and/or IG panel may be employed as well), where the metal foil 39 covers the electrical connection for each metallic tab 24, thus providing the measure of electrical redundancy, from within the laminated glass panel 40, starting at the sight line 29, and then externally covering the extension of the metallic tabs 24.

Subsequently, the metallic tabs 24 mate with the connection clips 41, which are embedded in the base setting block 47, as shown in FIG. 1b. A mechanical connection between the laminated glass panel 40 and the base setting block 47 is achieved by a mating of one or more panel setting blocks 35 and one or more base setting indentations 43, as shown in FIGS. 1b and 5.

Figure 6A:
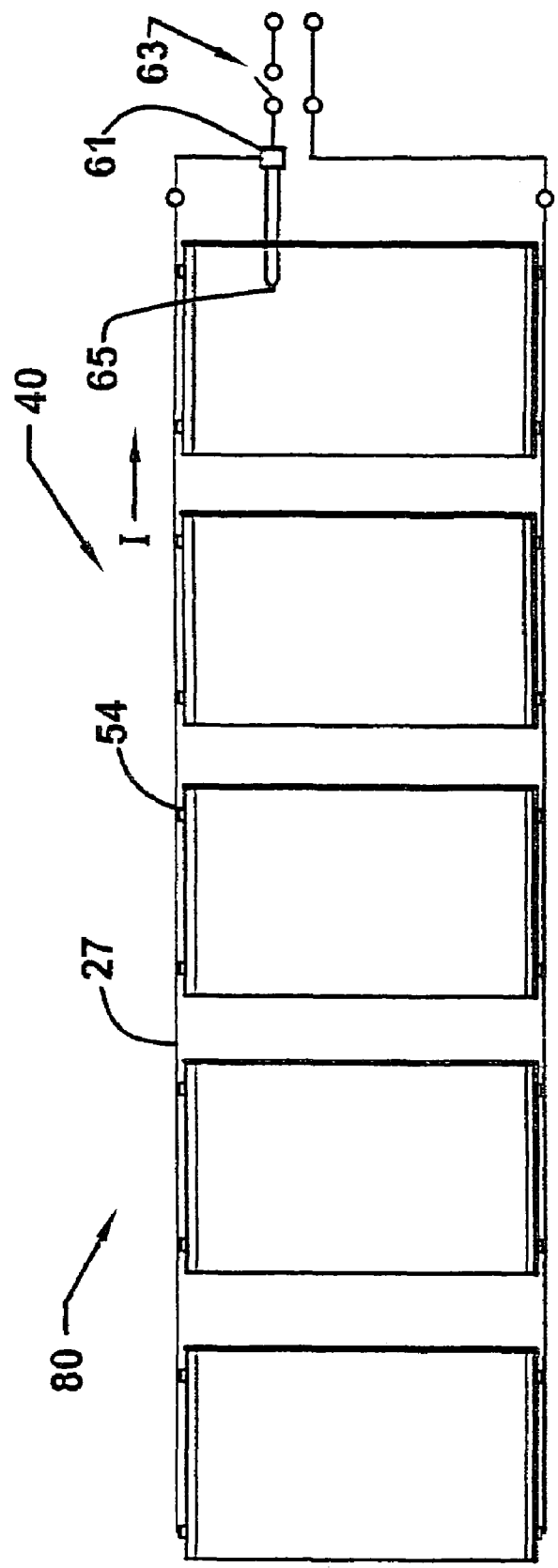
FIG. 6a is a side view of an interconnection of multiple electrically conductive heated glass panels in accordance with the present invention.
Figure 6B:
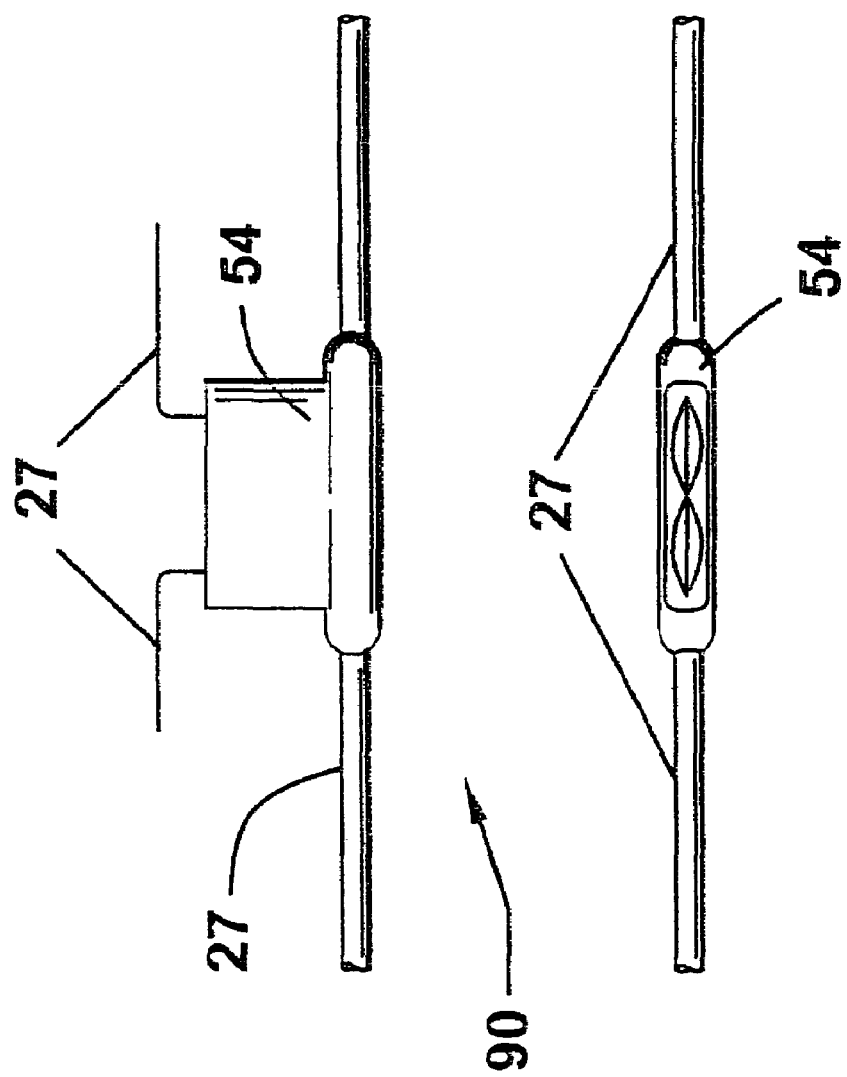
FIG. 6b is a side and bottom view of a wiring method showing a push-on connector and interconnection wires in accordance with the present invention.

In accordance with the present invention, the combination of FIGS. 6a and 6b illustrate how an interconnect 80 uses multiple panel wiring 90 to interconnect multiple laminated glass panels 40. Channel conductors 27 and push-on connectors 54, in combination with the metal foil 39 and the connection clips 41 provide ease and redundancy to accomplish the interconnection of the multiple laminated glass panels 40. These interconnection means complement the use of the channel connectors 27 and the insulating sleeves.31 for interconnecting multiple laminated glass panels 40, as discussed above.

In addition, FIG. 6a shows an application of a thermocouple 65, a circuit breaker 61, and a power switch 63, which act to monitor temperature conditions and to control power within the integrated connection circuit 18. If the temperature of the laminated glass panel 40 exceeds a setpoint temperature, as set within the circuit breaker 61, the flow of electrical current (I) will be terminated. The power switch 63 is a manual means to also terminate the flow of the electrical current (I), within the integrated connection circuit 18.

By incorporating the wiring of the laminated glass panel 40 into the base setting block 47 and providing easy and redundant multiple panel wiring 90, the present invention eliminates the difficulty of making electrical connections. The hole drilling process into the glass sheet 32 or coated glass sheet 34, prior to lamination, as is typically done to expose the bus bars 22 for connection to the alternating current power source 19, is eliminated.

Instead, the present invention uses the metallic tabs 24 and metal foil 39, described herein that are easily incorporated into the integrated connection circuit 18. The wiring connections between parts of the integrated connection circuit 18 may have flexible boots (not shown) encasing the connections, and the glazing sealant 23 may be used to attach the flexible boots to the glass panel peripheral edge 37, so as to minimize mechanical wear and accumulation of moisture. The flexible boots, with enclosed wiring, may be dressed through conventional gaskets or sealed with sealant and then terminated in National Electrical Code (NEC) electrical wiring boxes.

Typically, the internal integrated connection circuit 18 will be completed during manufacturing, so as to minimize the need for on-site electricians doing system wiring at the time of field installation. Instead, electricians would need to simply verify correct connection and terminate electrical load wiring at the time of field installation. Glaziers would typically be the primary installers of the electrically conductive heated glass panel 20 by glazing the wiring 90, boots, frames 48, and panels 30, 40, which should preserve manufacturing integrity and improve reliability of the electrically conductive heated glass panels 20.

FIG. 7 shows a cross sectional view of an installation of a single laminated glass panel 40 within a second glazing channel 60'. However, it can be appreciated that multiple laminated panels 40, multiple insulated glass panels 30, or combinations of the panels 30, 40 could be realized in this aspect of the present invention. Also, these panels 20 may be used in heated glass, switchable glass, and photovoltaic applications. In addition, this aspect may be applied to architectural glazing as well as cladding material.

As shown, the laminated glass panel 40, along with various parts of the second glazing channel 60' are disposed on the channel frame 67. A portion of the laminated glass panel 40 is shown being disposed within the second glazing channel cavity 59' and abutting the channel frame 67, wherein the metallic tab 24 extends beyond the periphery of the panel 40. Mechanically and electrically disposed on the metallic tab 24 is a spade connector 96, which is mechanically and electrically disposed on an end of channel conductor 27. The channel conductor 27 is shown being disposed within the channel conduit 95, which passes through a coupler 91 to the conductor block 93. Within the conductor block 93 a second end of the channel conductor 27 may be mechanically and electrically disposed on the multiple channel wiring 90 (shown in FIG. 6b) or by conventional means in the art on the channel conductors 27 that are part of the interconnect 80 (shown in FIG. 6a).

Multiple connections, as FIG. 7 illustrates, may be provided in each of the glazing channels 60, 60', in order to assure the measure of redundancy of the electrical connectivity to the panels 30, since maintenance and removal of the panels 30 would be tedious and costly.

Figure 8A:
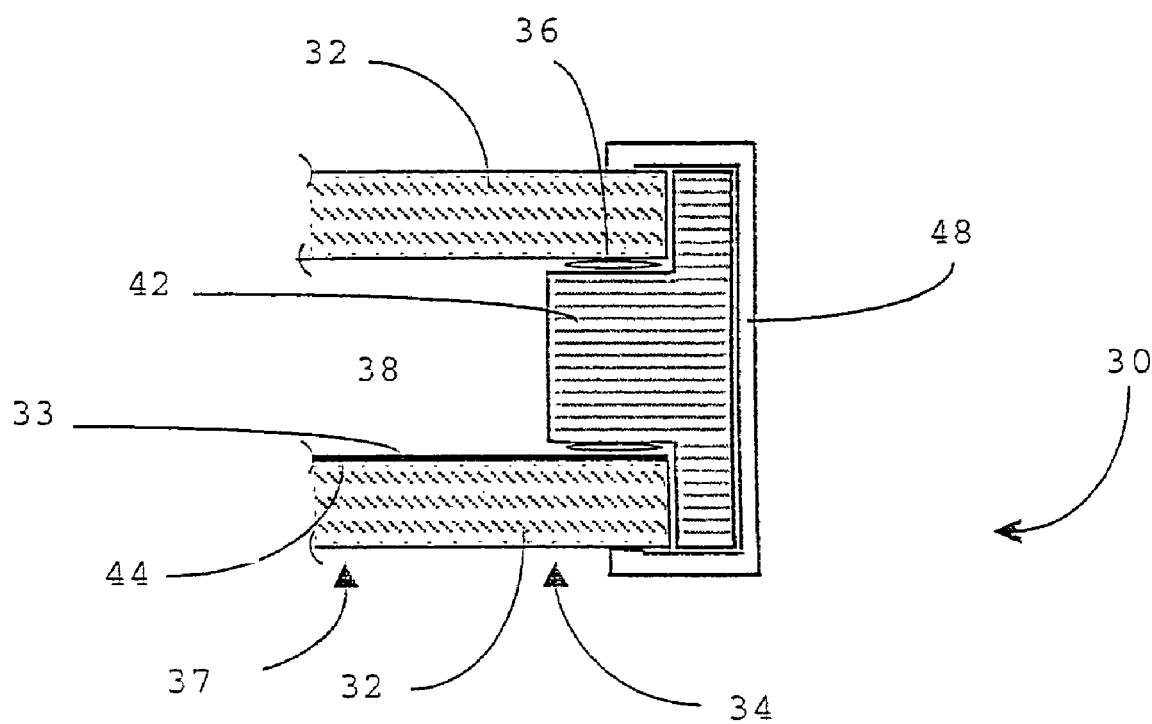
FIG. 8a is a cross sectional view at a peripheral edge of an insulated glass panel where a T-shaped spacer seal unit and a panel frame are employed in accordance with the present invention.

FIG. 8a illustrates a cross sectional view at the glass panel peripheral edge 37 of the insulated glass-panel 30 where the glass sheet 32 and the coated glass sheet 34 are separated by an insulating T-shaped spacer-seal 42 (conventionally known as a seal unit) that is disposed around the periphery 37 therebetween. The insulating T-shaped spacer seal 42 could comprise foamed silicone. In addition, an adhesive sealant 36 is disposed on surfaces of the insulating T-shaped spacer seal 42 where the insulating T-shaped spacer seal 42 makes contact with the glass sheet 32 and the coated glass sheet 34. The adhesive sealant 36 functions to maintain a specified gaseous concentration, preferably at atmospheric pressure, however, any desired pressure may be maintained within a space 38 between the glass sheet 32 and the coated glass sheet 34.

To seal out contaminants and to protect the seal units, a panel frame 48 may be provided that covers the entire seal unit, as it is disposed around the periphery of the insulated glass panel 30. As so described, the glass edge sealing method may not require that the electrically conductive coating 44 be removed from the coated glass sheet 34, which may eliminate the need for "edge deletion" and associated costs.

Figure 8B:
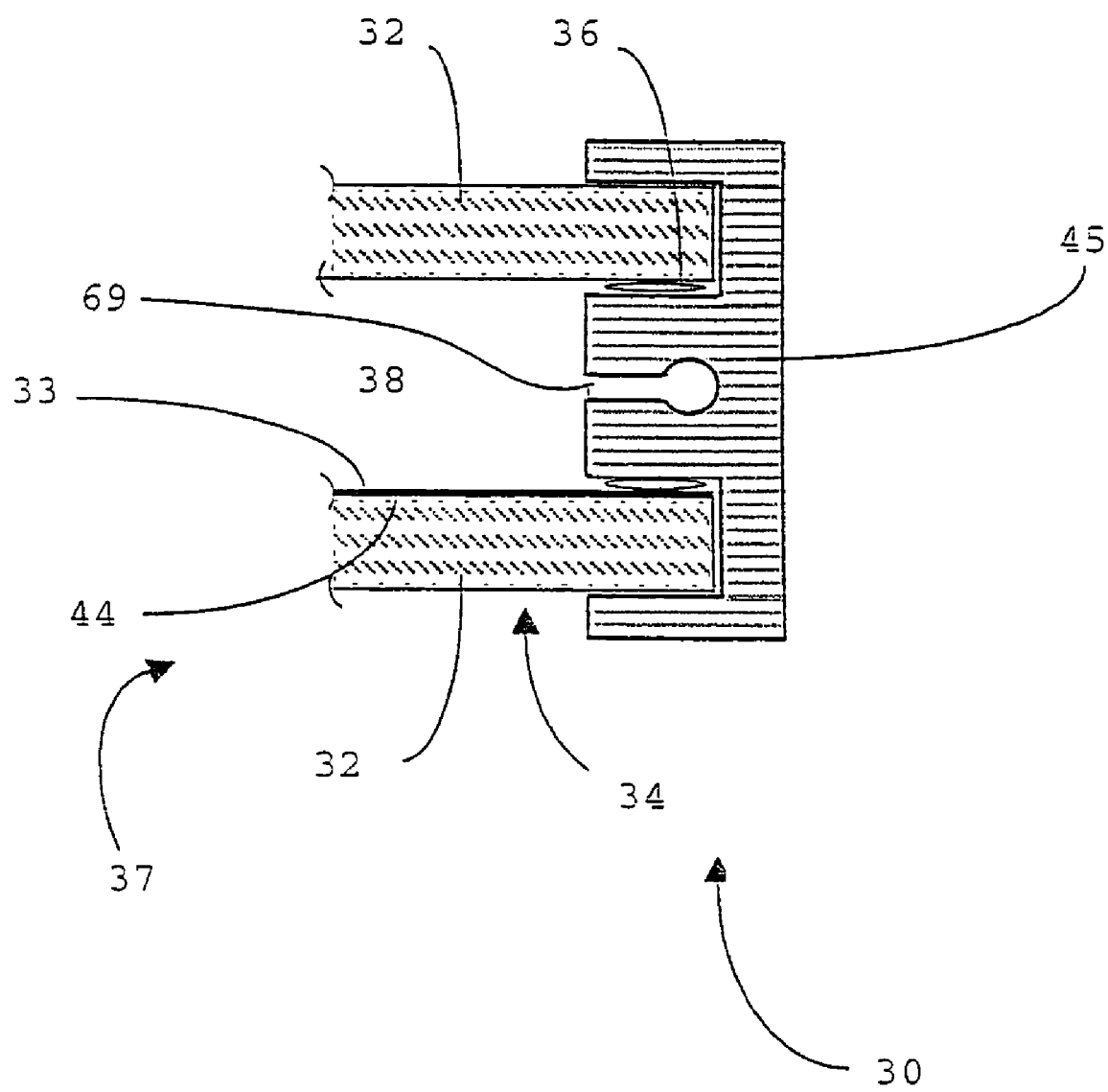
FIG. 8b is a cross sectional view at the peripheral edge of the insulated glass panel where an E-shaped spacer seal unit is employed in accordance with the present invention.

FIG. 8b illustrates a cross sectional view at the glass panel peripheral edge 37 of an insulated glass panel 30' in accordance with the present invention. The application shown in FIG. 8b is similar to that shown in FIG. 8a with the exception that the glass sheet 32 and the coated glass sheet 34 are separated by an insulating E-shaped spacer seal 45 (seal unit) that is disposed around a periphery therebetween. The insulating E-shaped spacer seal 45, having a seal cavity 69, could comprise silicone. The seal cavity 69 may be used as a wiring chase for the placement of interconnecting wiring and for placement of a desiccant, which is used to remove moisture that enters the space 38. The panel frame 48, as shown in FIG. 8a, if so required, may be disposed around the E-shaped spacer seal 45 of FIG. 8b.

Some preferred applications of the insulated glass panels 30 of FIGS. 8a and 8b would be as architectural panels, such as in glazings for commercial buildings, sports stadium skyboxes, sloped glazing in atria, canopies, general fenestration applications, architectural solar panels and other photovoltaic applications, where the removal of condensation on the surface of glass panels would be accomplished by heating the panels to above a dew point.

If so needed, these applications could utilize the integrated connection circuit 18 of FIG. 1a, where the current-switch circuit 15 would be like that shown in FIG. 2. Due to its design, the current-switch circuit 15 allows the alternating current (I) to be optically isolated from the control circuit 25, wherein the solid-state controller 16 operates the current-switch circuit 15 in the zero-axis crossing manner. The temperature and/or moisture condition sensors 21 would monitor ambient conditions and communicate these conditions to the solid-state controllers 16, in order for the solid-state controllers 16 to command the current-switch circuit 15 to provide the alternating current power source 19 to the electrically conductive heated glass panels 20 for the desired heating of the electrically conductive heated glass panels 20.

In addition to controlling the heating of the insulated glass panels 30, the solid-state controllers 16 would monitor the current (I) passing through the conductive strip switches 26 that would be mounted in the insulated glass panels 30. In the event that the conductive strip switch 26 opens, which could be due to the glass sheet 32 breaking, the current to that electrically conductive heated glass panel 20 would be stopped by the solid-state controller 16, which would remove the possibility that individuals would be exposed to live electrical hazards.

A major advantage of using IG panels 30 with low-E coating 44 as the heating element (as opposed to directly connected resistance coatings) is the large improvement in energy efficiency, where 25% to 30% improvement can be realized, while operating at comparable surface temperatures. These results are due to the improved thermal R-values that result from, for example, double or triple pane IG low-E panels 30. In addition, if the space 38 is filled with argon or krypton, in place of air, the resulting heating from the IG panels 30 is equivalent to base board or other electrical resistance heating methods. Added advantages of the use of low-E IG panels 30 are an allowance of more humidity in the room before the onset of condensation and usability of the area adjacent to the windows in extremely cold climates.

Warming shelves 106, 108 and other applications of the panels 30 that would be made as those shown in FIGS. 8a, 8b would have the following advantages: a) the deletion of the coating 44 on the edge 37 is unnecessary, b) superior edge protection is provided by the polymeric T-shaped seal 42 and E-shaped seal 45, and c) the wire chase provided by the seal cavity 69 of the E-shaped seal 45 facilitates dressing of the channel conductors 27.

Figure 9:
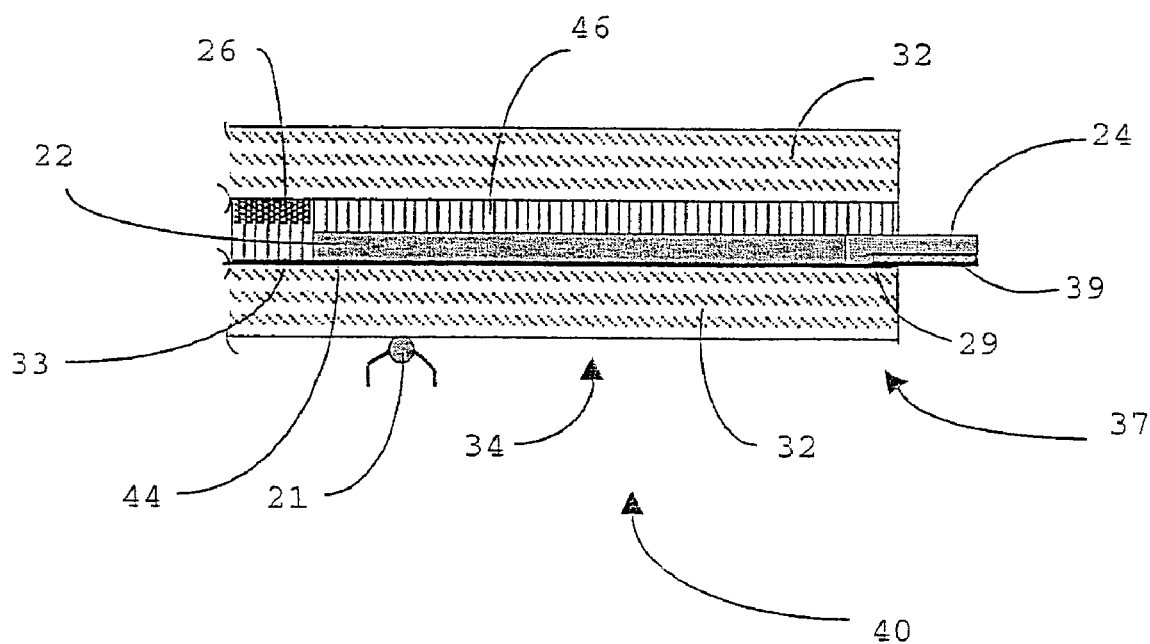
FIG. 9 is a cross sectional view at a peripheral edge of a laminated glass panel in accordance with the present invention.

FIG. 9 illustrates a cross sectional view at the glass panel peripheral edge 37 of the laminated glass panel 40, in accordance with the present invention. The electrically conductive coating 44 is deposited onto a major surface 33 of a glass sheet 32 resulting in the formation of the coated glass sheet 34. In turn, the bus bars 22 are deposited onto the electrically conductive coating 44.

Further, the metallic tab 24 is disposed on the bus bar 22, where a portion of each metallic tab 24 extends beyond the peripheral edge 37 of the laminated glass panel 40. Subsequently, the metal foil 39 is disposed on and in electrical contact with the metallic tab 24, while also being disposed on and in electrical contact with the coating 44 from the peripheral edge 37 of and within the laminated glass panel 40, up to the sight line 29. To complete an assemblage of the laminated glass panel 40 thus described, the parts so stated, are brought together with the glass sheet 32 while the interlayer 46 of polymeric material is disposed therebetween. The interlayer 46 of polymeric material may comprise polyvinyl butyral (PVB).

Some of the preferred applications of the present invention that would use the laminated glass panels would be as heated glass applications in vehicles, aircraft, vessels, and the like, where the removal of condensation and moisture could be achieved on windows, mirrors, and glass parts.

Photovoltaic laminated panels, which absorb light energy in photosensitive material that is disposed on the coated glass sheet 34, pass the absorbed energy through the bus bars 22 and metallic tabs 24, in a way similar to that of the present invention.

Another application of a laminated panel 40 would be as an automotive rear window defogger where the panel 40 would replace the individual heater wires. The present invention would provide an invisible, faster, and more even heater replacement for the current heaters.

Further, results from testing indicate that when the panels 30, 40 of the present invention are used in various applications that currently use coil, wire type, and parallel resistance heaters, 40% less energy is required to power the panels 30, 40. This is due in part to the low-E properties, the placement of the coating 44, and the uniformity of the coating. Rear window defoggers and cooking heating elements benefit from this coating heater design.

In addition to glass substrate material, it has also been found that the panels 30, 40 of the present invention may be realized by the use of ceramic and glass-ceramic substrate materials. The coating 44, bus bars 22, and metallic tabs 24 are deposited equally as well as on glass and that certain applications, for example, cooking and warming, may realize aesthetic and cost benefits from the use of ceramic and glass-ceramic materials.

The laminated glass panels 40, as shown in FIG. 9, could be applied where the integrated connection circuit 18 that is shown in FIG. 1a, would use moisture and temperature condition sensors 21 to send signals (S) to the solid-state controllers 16, which in turn would communicate with the current-switch circuit 15. The result of the current (I) flowing through the electrically conductive heated glass panel 20 is to heat the glass and mirrors, so as to remove moisture and condensation from the electrically conductive heated glass panel 20.

In addition, through the use of the solid-state controller 16, varying power levels could be provided to achieve functions like defogging and deicing, where more power is provided for deicing. The voltage and current condition sensors 21 may also be applied to sense glass breakage by the use of the conductive strip switches 26. With the present invention, the solid-state controller 16 may be used in a vehicle to control various electrically conductive heated glass panels 20 having a variety of sizes and geometries to maintain, for example, all such glass panels 20 at one temperature or each glass panel 20 at a different temperature.

With the current-switch circuit 15 being operated in the alternating current, zero-axis crossing manner, those vehicles, for example, automobiles, that only have a direct current power source, would require conventional inverter circuitry to generate the alternating current that is needed for the current-switch circuit 15. However, other vehicles and vessels, for example, emergency vehicles, fire trucks, ships, yachts, trains, and large earth moving vehicles, may have on-board alternating current power sources 19 that would not require the conventional inverter circuitry and could be connected directly to the present invention's integrated connection circuit 18, as illustrated in FIG. 1a.

Further applications of the laminated glass panels 40 would have the present invention being utilized in commercial refrigerator/freezer door applications, where the removal of condensation on the surface of the laminated glass panel 40 that is exposed to the cold air inside of the refrigerator or freezer would be accomplished by heating the laminated glass panel 40 to a temperature above the dew point. These applications would utilize the integrated connection circuit 18 of FIG. 1a, the laminated glass panel 40 of FIG. 9, and the triac circuit 17 of FIG. 2.

Temperature and/or moisture condition sensors 21 would monitor ambient conditions and communicate these conditions to solid-state controllers 16, which in turn command the current-switch circuit 15 to conduct alternating current to the laminated glass panels 40, which would subsequently heat the laminated glass panels 40, thus removing condensation or other forms of moisture.

In addition to controlling the heating of the laminated glass panels 40, the solid-state controllers 16 would monitor current (I) passing through the conductive strip switches 26 that are mounted on coated glass sheets 34. In the event that a conductive strip switch 26 opens, which could be due to a particular laminated glass panel 40 breaking, the current to that laminated glass panels 40 would be disrupted, hence removing the possibility that individuals would be exposed to live electrical hazards. Since the solid-state controller 16 would be monitoring the conductive strip switches 26, it would sense that a particular conductive strip switch 26 had opened and would alert necessary personnel.

Two problems that arise with supplying electrical current to banks of refrigerator/freezer doors that the use of solid-state controllers 16 would overcome, are: (1) the precise electrical control of the uniform low E heating coatings 44 that should result in uniform heating of the laminated glass panels 40 of the banks of refrigerator/freezer doors and (2) the synchronization of the current-switch circuit 15 switching to overcome peak current problems.

Because a bank of laminated glass panels 40 presents a large demand for power, solid-state controllers 16 would be used to provide power demand-based control to avoid brown outs, power peak monitoring to control kilowatt usage costs, and "turning back" of the supply of power in off-hours to also control kilowatt usage costs. Condition sensors 16, other than temperature and moisture, for example, voltage and current, would be used to signal the solid-state controllers 16 for commanding a variety of conventional operations.

Note that the use of electronic controls with both IG panels 30 and laminated panels 40 of the present invention result in higher heating efficiency while using less power than conventional panels and while providing greater safety. This is due to the use of low emissivity coated glass that places the heating element in an advantageous position with respect to the user and items being heated, and provides for less electrical noise generation.

FIG. 10a, which involves the deposition of the bus bars 22 onto the coating 44 that is deposited on the glass sheet 32, illustrates a diagramatic view of a circularly rotating heating head and mask apparatus 50 in accordance with an aspect of the present invention. The bus bars 22, as shown in FIGS. 1a, 1b, and 1c, function to electrically connect the metallic tabs 14, which are the exterior connections for delivering the electrical current (I) to the coating 44 of the glass panels 20. As a result, the current (I) supplied to the coating 44 causes the coating 44 to dissipate heat.

FIG. 10a illustrates the deposition of bus bars 22 on the coated glass sheet 34, which may be deposited through the use of improved deposition methods in accordance with further aspects of the invention. For example, the coating deposition may comprise chemical vapor deposition, where the coating 44 is deposited onto the dielectric substrate material, for example, the glass sheet 32. The coated glass sheet 34 may then be exposed to a preheat zone 70 upstream and, if "edge deletion" is required, the conveyor 88 transports the coated glass sheet 34 to a circular edge mask 66. While moving within the circular edge mask 66, a first area 92 of the coated glass sheet 34 is heated by a coating heater 76. The coating heater 76 could comprise, as examples, an oxyacetylene burner, a plasma device, an electric arc gun, or a flame spray gun.

In the case of the electric arc gun, electrical current is conducted through metal wires that are fed into the electric arc gun in order to melt the metal wire. In all of the alternatives for the coating heater 76, very high velocity airflow entrains and accelerates the molten metal particles to ensure good adhesion.

In the first area 92, temperatures up to and about 1300 degrees Fahrenheit may be attained in order to heat, thermally shock, and evaporate the electrically conductive coating 44.

Edge deletion may also be achieved without the use of the edge mask 66. This may be accomplished through precise placement of the heat and thermal control and set up of the coating heater 76, such that the coating 44 is precisely thermally shock heated and evaporated. Either of these processes may be required for the IG panels 20 (shown in FIGS. 8a and 8b) to establish a better surface for sealing in the atmosphere within the space 38.

By either method, a residue of the electrically conductive coating 44 is formed and may, subsequently, be removed by a coating remover 68, which, for example, may be a buffer or a burnishing tool. The coating remover 68 may be required for the IG panels 20 (shown in FIGS. 8a and 8b) to establish a better surface for sealing in the atmosphere within the space 38. As a result, this process produces a deleted edge 71, as shown in FIG. 10a.

Next, as FIG. 10a also illustrates, the coated glass sheet 34 is conveyed to a circular inner mask 72 and a circular outer mask 74 where a second area 94 of the coated glass sheet 34 is defined therebetween and where dimensional control of the placement, thickness, tapering, and height of the bus bars 22 is achieved. First a reducing flame 78 heats the second area 94 in a stoichiometric atmosphere, where oxidation of a molten metal 64 is controlled during bus bar 22 deposition, while not fracturing or de-tempering the coated glass sheet 34. The reducing flame 78 could comprise oxyacetylene or hydrogen. As a result, the second area 94 is taken to a temperature of about 500 degrees Fahrenheit.

Subsequently, a metal feeding and heating device 62, which is supplied by gas one 82, gas two 84, and gas three 86 feeds conductive metal 56, preferably in the form of a wire (however, the conductive metal could be fed as a powder or in other forms), melts the conductive metal 56, and then propels and impinges particles of the molten metal 64 in a predetermined manner, for example, a uniform manner, onto the second area 94. The metal feeding and heating device 62 preferably comprises a plasma gun, while the three gases 82, 84, and 86 preferably comprise oxygen, air, and acetylene, and the conductive metal 56 preferably comprises copper.

This operation results in the bus bars 22 being uniformly formed on, and adhering strongly to, the electrically conductive coating 44. The formation of the bus bar 22 occurs, for example, near the glass panel peripheral edges 37, before the laminated glass panel 40, as shown in FIG. 9, or the IG panels 30 and 30', as shown in FIGS. 8a and 8b, are fully assembled.

Added advantages of the circularly rotating heating head and mask apparatus 50 are that its rotation and size allow for: (1) dissipation of built up heat, (2) the excess molten metal 64 to be scraped, brushed, or blown clean, and (3) accurately depositing the molten metal 64 onto the electrically conductive coating 44 so as to shape the bus bars 22. The shaping of the bus bars 22, if so preferred, may be tapered toward the glass panel peripheral edge 37 and/or tapered on end, as well.

The result of these steps is the production of conductive metal bus bars 22 that are uniformly deposited and have good mechanical bonding to the electrically conductive coating 44, which makes them robust for external connectivity. In addition, the bus bars 22 possess good ohmic conductivity themselves and also in relation to the electrically conductive coating 44.

Further, the circularly rotating heating head and mask apparatus 50 accurately controls the thickness of the resulting copper bus bars 22, so that the thicker the bus bars 22, as shown in FIGS. 1a and 1b, the higher the electrical current (I) that can be conducted through the bus bars 22, which consequently provides higher electrical current (I) that can be supplied to the glass panel 20 or plurality thereof. In the case of electrically conductive heated glass panels 20, the higher the electrical current (I) that can pass through the electrically conductive heated glass panels 20 the higher the heat that can be dissipated by the electrically conductive heated glass panels 20. Also, the use of copper as the bus bar 22 material is less expensive than silver. However, the present invention may be practiced where silver or other conductive metals comprise the bus bar materials.

An additional advantage of this process is that it allows the bus bars 22 to be deposited after thermal tempering of the electrically conductive heated glass panels 20. Although not wishing to be bound by any theory, it is believed that there is no alloying of the molten metal 64, for example, copper, with the electrically conductive coating 44, since the electrically conductive coating 44 is highly chemically inactive and stable. The electrically conductive coating 44 preferably comprises tin oxide. It has also been found that the deposition of the conductive metal, for example, copper, bus bar 22 will also adhere strongly to the coating 44 as it is disposed on ceramic or glass-ceramic substrates.

To form the bus bars 22, the circularly rotating heating head and mask apparatus 50 of the present invention does not use an aqueous solution. Instead, it heats and shapes the bus bars 22 onto the electrically conductive coating 44 by melting the conductive metal 56, and imparting pressure, through the gasses one 82, two 84, and three 86, to impinge, at a high velocity, the molten metal 64 onto the heated and masked second area 94 on the electrically conductive coating 44.

Further, the metallic tabs 24 may then be readily conductively affixed to external wiring 27 as part of the integrated connection circuit 18. The panel 20, as so constructed may be used for cooking appliances, for example, a heating (conventionally known as a "burner") element. The bus bar deposited panel 20, as thus described, may also be used to form IG panels 30, laminated panels 40, or combination thereof.

Illustrated in FIG. 10b is an inline heating head and mask apparatus 50' that is also capable of edge deletion and capable of disposing the bus bar 22 on the coated glass sheet 34. If edge deletion is required, the coated glass sheet 34 moves on the conveyor 88 so that the edge of the coated glass sheet 34: a) may be preheated in the preheat zone 70, b) be thermally shocked at the first area 92, and c) have the coating 44 removed by a coating remover 68, which, for example, may be a buffer or a burnishing tool, d) is formed into the deleted edge area 71. This process is the same as that described above for the circularly rotating heating head and mask apparatus 50, with the exception that an inline edge mask 66' replaces the circular edge mask 66.

Note that edge deletion may also be achieved by the apparatus 50, 50' without the use of the edge masks 66, 66'. This may be accomplished through precise placement of the heat and thermal control, and set up of the coating heater 76, such that the coating 44 is precisely thermally shock heated. This process may be required by the IG panels 30 (shown in FIGS. 8a and 8b) to establish a better surface for sealing in the atmosphere within the space 38.

As the coated glass sheet 34 moves further on the conveyor 88, the bus bar 22 can be disposed on the coating 44 in the same manner described above for the circularly rotating heating head and mask apparatus 50, except that an inline inner mask 72' and an inline outer mask 74' are used instead of the circular masks 72 and 74. The inline masks 72' and 74' can also result in the same precise formation of the bus bars 22 as the circularly rotating heating head and mask apparatus 50.

Figure 10C:
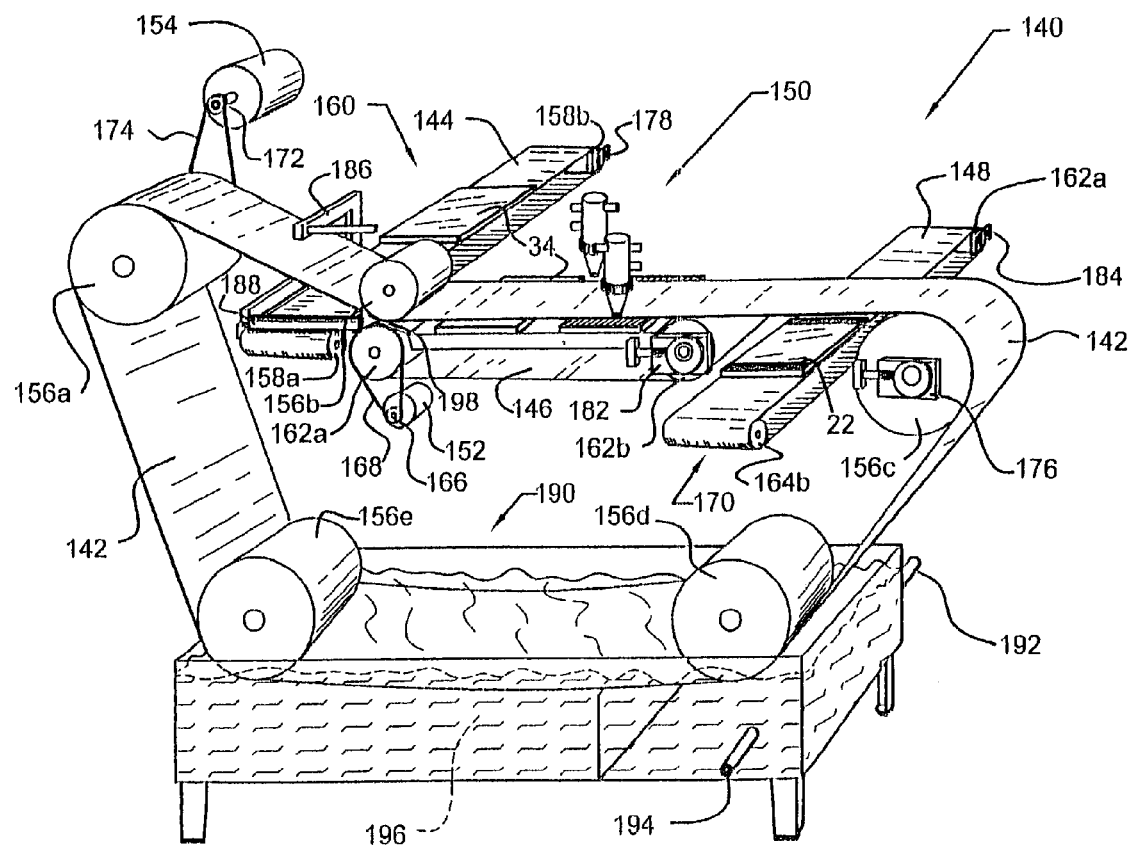
FIG. 10c is a perspective view of a belt based inline heating head and mask apparatus in accordance with the present invention.

A variant of the inline heating head and mask apparatus 50' is a dual belt based inline heating head and mask apparatus 140 that is shown in FIGS. 10c–10e. The apparatus 140 comprises: 1) a work piece input area 160, comprising a first belt 144, first rollers 158, and a first speed and tension adjuster 178, 2) a second belt 142, second rollers 156, and a second tension adjuster 176, and being driven by second motor 154, second motor pulley. 172, motor belt two 174, 3) a third belt 146, third rollers 162, and a third tension adjuster 182, and being driven by third motor 152, third motor pulley 166, and motor belt three 168, 4) a thermo spray area 150, 5) a work piece output area 170, comprising a fourth belt 148, fourth rollers 162, and a fourth speed and tension adjuster 184, and 6) an overspray removing device 190.

This inline apparatus 140 may also be practiced by employing other means for driving the belts, for example, sprocket gears and chains, racks and pinions, and the like, while still remaining within the scope and spirit of the present invention.

In operation, an incoming coated glass sheet 34 is conveyed by the first belt 144 to an adjustable stop 188. Note that the coating 44 is on a side of the coated sheet 34 that will make direct contact with the second belt 142. Note also that the stop 188 is capable of adjustment so as to position varying sizes of coated glass sheets 34 at the end of the first belt 144.

Upon reaching the stop 188, the coated glass sheet 34 is positioned inline with a roller area 198 that is between the second belt 142 and the third belt 146 while centrally spanning the second belt 142. The width of the second belt 142 is chosen to be less than the width of the sheet 34 so as to allow the second belt 142 to act as a mask while exposing opposite edges of the coating 44 on the sheet 34.

Subsequently, a cylinder 199 causes an indexer 186 to urge the sheet 34 into the roller area 198 between second belt roller 156b and third belt roller 162a so as to convey the sheet 34 in a direction toward the thermo spray area 150. Note that the linear speeds of the belts 142, 146 being adjusted to be approximately the same by the respective adjusters 176, 182 and that the sheet 34 is held in place by a clamping force that is imposed by the opposing belts 142, 146. The cylinder 199 may be realized by any means that is conventional in the art to properly push or pull the indexer 186.

Upon reaching the thermo spray area 150, the exposed opposite edges of the sheet 34 may be heated by at least one reducing flame 78 (not shown but similar to those illustrated in FIGS. 10a, 10b)) and impinged by at least one metal feeding and heating devices 62, so as to dispose molten metal 64 onto the opposite edges of the coated sheet 34. The bus bar deposition operation is accomplished in much of the same manner as that used by the circular and inline heating head and mask apparatus 50, 50' and results in the deposition of the bus bars 22 at the opposite edges of the coated glass sheet 32. Ceramic or glass-ceramic sheets may replace the glass sheets.

Following bus bar deposition in the thermo spray area 150, the sheet 34 is conveyed to a fourth belt 148 having fourth belt rollers 164 and fourth speed and tension adjuster 184 and driven by a means (not shown) that is similar to the previously described motor, pulley, and belt, which in turn conveys the sheet 34 to a work piece output area 170. After drop-off of the sheet 34 onto the fourth belt 148, the second belt 142 may be exposed to the overspray removing device 190 in order to remove any conductive metal overspray that may have been deposited on the second belt 142. The overspray removing device 190 may be, for example, a tank containing a coolant 196 and having an outlet 192 and an inlet 194, where the overspray is removed by thermal shock and scraping. However, the present invention may be practiced where the overspray removing device 190 is at least one fan, scraper, or the like.

The dual belt based inline heating head and mask apparatus 140 is designed to produce panels 20 in a fast and simple manner for heating elements, for example, a so-called fifth burner appliance (like a separate cooking appliance that would rest on a counter-top) and cooktop heating elements. In these applications a high speed, low cost process is advantageous and this apparatus 140 is capable of achieving those goals while producing high quality electrical connectivity to the coating 44. However, this apparatus 140 may be used for producing panels other than burner elements, for example, photovoltaic applications.

In the present invention, the masks 66, 66', 72, 72', 74, 74', 142 may comprise steel with a layer of chrome plating disposed on the steel. This has been found to inhibit the adhesion of copper and other metals to the masks 66, 66', 72, 72', 74, 74', 142 thus allowing a simple spring loaded scraper to continually clean the overspray from the masks 66, 66', 72, 72', 74, 74', 142 during production of the bus bars 22. This operation allows the overspray and dust of the conductive metal 56 to be collected and re-sold. The present invention may further deposit soft electrically conductive materials (not shown) that include metal and metal oxides, often in combination with each other, onto the bus bars 22, following bus bar deposition to the coating 44.

Examples of the soft conductive materials are silver based systems like (metal oxide/silver/metal oxide) and variants including double silver stacks and indium-tin-oxide (known as ITO.) All constructs of the bus bars 22, metallic tabs 24 and the panels 20 that have been disclosed herein apply with the addition of the deposition of the soft conductive materials.

The soft coatings may be deposited in a vacuum deposition process like that produced by DC Magenetron Sputtering after the bus bars 22 are deposited on the coatings 44. For example, these soft coatings may be copper traces that would conduct electrical current to electrical components that would be mechanically attached to the glass sheet 32 or coated glass sheet 34. An example electrical component would be a capacitive moisture sensing unit on the sheet 32, 34.

Figure 11:
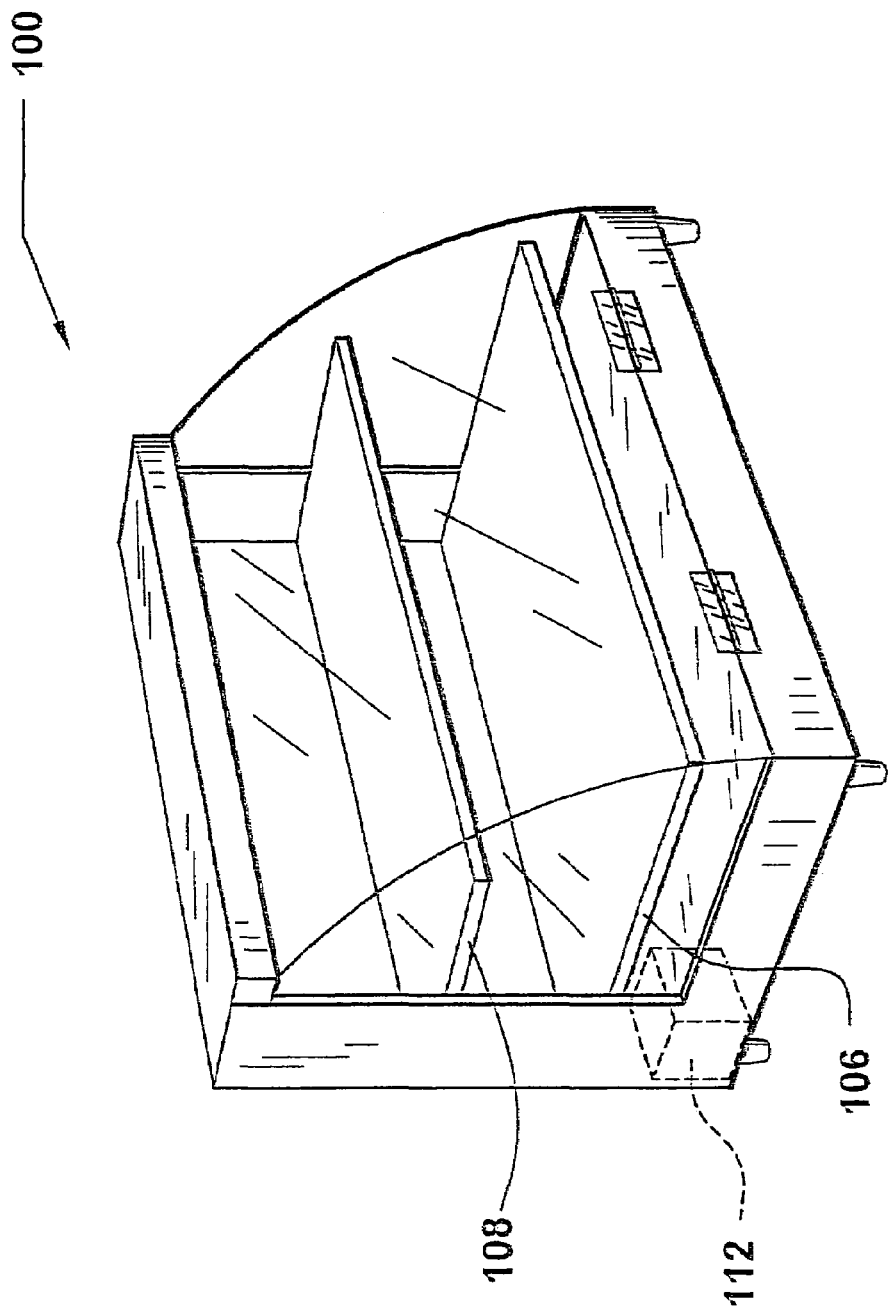
FIG. 11 is a perspective view of a warming oven in accordance with the present invention.

Another example of the present invention being used as an appliance is illustrated in FIG. 11, which is a perspective view of a warming oven 100. The warming oven 100 would have at least a first warming shelf 106, however, FIG. 11 shows the warming oven 100 with the first warming shelf 106 and an accompanying second warming shelf 108. The warming shelves 106, 108 would comprise insulated glass panels 30, wherein the bus bars 22 and metallic tabs 24 have been formed thereon in the manner described above in the present invention. The control of the warming of items placed in the warming oven 100 would be accomplished by the oven controls 112, which would comprise the elements of the integrated connection circuit 18.

An added advantage of the use of the insulated glass panel 30 in the warming oven 100 is that the insulated glass panel 30 affords physical separation between the coating 44 and the item being thermo-conductively warmed, wherein capacitive coupling and leakage currents from the heating coating to the item being heated are virtually eliminated, thus eliminating electrical shock potential and spark ignition for a fire.

Figure 12:
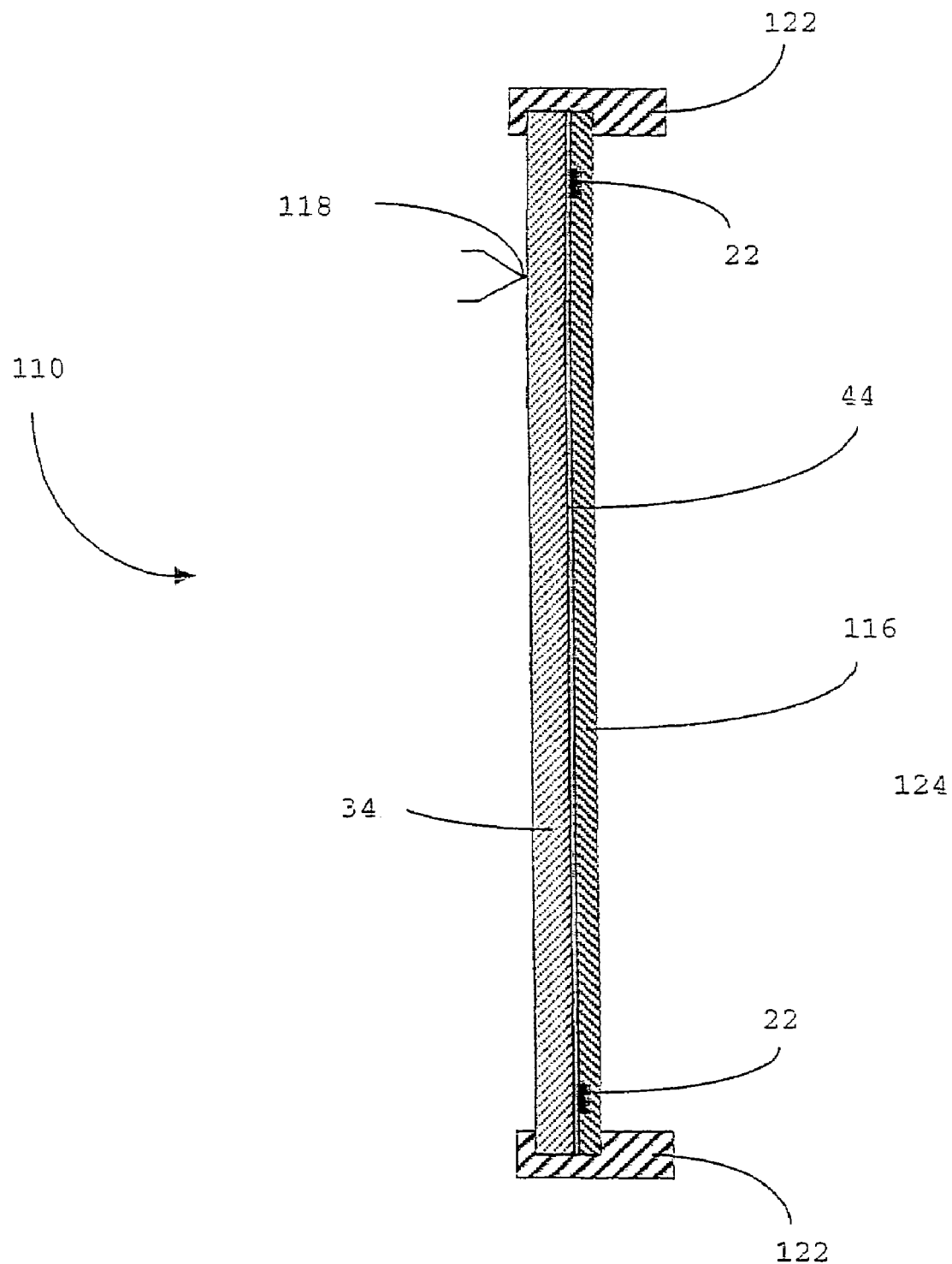
FIG. 12 is a cross sectional view of an oven door panel in accordance with the present invention.

FIG. 12 illustrates another aspect of the present invention, where there is shown an oven door panel 110, which is mounted in an oven door frame 122 for viewing food items being cooked in an oven interior 124. This aspect of the present invention utilizes an assembly comprising a temperature sensing means, for example, rapid measurement of the voltage across the bus bars 22 (as discussed above in conjunction with a controller 16) or a temperature switch 118 disposed on the exterior of the coated glass sheet 34, with bus bars 22, for example, copper, disposed on the coating 44 (in the manners described above for the present invention), and a thermally activated light scattering material 116 disposed on the coating 44. The light scattering material 116 may comprise, for example, ThermoSEE™ which is commercially available from Pleotint LLC, West Olive, Mich.

The temperature switch 118 would be part of the integrated connection circuit 18 for the oven (not shown) and would function to sense the exterior temperature of the oven door panel 110. If the exterior temperature of the oven door panel 110 would exceed a setpoint temperature, the temperature switch 118 would electrically open, which in turn would cut off current (I) to conventional oven heating elements (not shown), so as to eliminate the possibility of burning a person that might touch the exterior surface of the oven door panel 110.

The bus bars 22, which may be connected to and controlled by the integrated connection circuit 18, by way of the metallic tabs 24 that are disposed on the bus bars 22 and electrically connected to the channel conductors 27, are used to precisely control the heating of the oven door panel 110 so as to precisely control the opacity of the light scattering material 116, which is opaque at room temperature and up to a temperature of about 150 degrees F., at which temperature and above, the light scattering material 116 becomes essentially transparent. As a result, the contents of the oven interior 124 can be viewed from outside of the oven under the precise control of the integrated connection circuit 18 of the present invention or by conventional means in the art.

In accordance with the provisions of the patent statutes, the principles and modes of operation of this invention have been described and illustrated in its preferred embodiments. However, it must be understood that the invention may be practice otherwise than specifically explained and illustrated without departing from its spirit or scope.

What is claimed is:

1. A method of heating a glass panel, comprising:
providing a glass panel with a coating of a conductive doped metal oxide disposed thereon;
impinging molten particles of copper at high velocity onto the coating of the conductive doped metal oxide, thereby forming a copper bus bar that is in electrical connectivity with the coating of the conductive doped metal oxide; and
providing electricity to the copper bus bar, thereby heating the glass panel.

2. The method of claim 1, wherein the copper bus bar is in electrical communication with electrical components that are physically disposed on the glass panel.

3. The method of claim 2, wherein the electrical components comprise at least one solar panel or a capacitive moisture sensing unit.

4. The method of claim 1, wherein a plasma gun or an oxyacetylene device is utilized for the impinging of the molten particles of copper at high velocity onto the coating.

5. The method of claim 1, further comprising providing at least one circularly rotating mask for shaping and sizing the copper bus bar.

6. The method of claim 1, further comprising providing at least one inline mask for shaping and sizing the copper bus bar.

7. An electrically conductive heated glass panel made by the method of claim 1, whereby the copper bus bar has a metallic tab in electrical contact therewith, thus forming the electrically conductive heated glass panel capable of ready connection with a source of electrical power.

8. A method of heating a ceramic panel or a glass-ceramic panel, comprising:
providing a ceramic panel or a glass-ceramic panel with a coating of a conductive doped metal oxide disposed thereon;
impinging molten particles of copper at high velocity onto the coating of the conductive doped metal oxide, thereby forming a copper bus bar that is in electrical connectivity with the coating of the conductive doped metal oxide; and
providing electricity to the copper bus bar, thereby heating the ceramic or the glass-ceramic panel.

9. A method of depositing a copper bus bar on a coating of a conductive doped metal oxide disposed on a glass panel, comprising:
masking an area of a conductive doped metal oxide coating;
heating the area of the conductive doped metal oxide coating with a reducing flame;
feeding copper into a metal feeding and heating device;
melting the copper; and
impinging molten particles of the copper at high velocity onto the area of the conductive coating, thereby depositing a copper bus bar on the conductive doped metal oxide coating.

10. The method of claim 9, wherein at least one circularly rotating mask or at least one inline mask is utilized for masking and heating the area of the conductive coating with the reducing flame.

11. The method of claim 9, wherein the reducing flame comprises hydrogen.

12. The method of claim 9, wherein the reducing flame comprises oxyacetylene.

13. The method of claim 9, wherein the metal feeding and heating device comprises a plasma gun or an oxyacetylene device.

14. The method of claim 9, wherein the heating comprises imparting a temperature of about 500 degrees F. to the area of the conductive coating under stoichiometric conditions, whereby a combination of oxygen with the molten copper is controlled.

15. The method of claim 9, further comprising shaping and sizing of the copper bus bar.

* * * * *